US011877121B2

(12) United States Patent
Ookuri et al.

(10) Patent No.: US 11,877,121 B2
(45) Date of Patent: Jan. 16, 2024

(54) SPEAKER SYSTEM AND SOUND OUTPUT METHOD

(71) Applicant: Sony Group Corporation, Tokyo (JP)

(72) Inventors: Kazunobu Ookuri, Kanagawa (JP); Kohei Asada, Kanagawa (JP); Masaki Kamata, Tokyo (JP); Hiroyuki Shirakawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/780,467

(22) PCT Filed: Oct. 12, 2020

(86) PCT No.: PCT/JP2020/038471
§ 371 (c)(1),
(2) Date: May 26, 2022

(87) PCT Pub. No.: WO2021/111735
PCT Pub. Date: Jun. 10, 2021

(65) Prior Publication Data

US 2023/0007389 A1 Jan. 5, 2023

(30) Foreign Application Priority Data

Dec. 4, 2019 (JP) ................................. 2019-219363

(51) Int. Cl.
*H04R 1/32* (2006.01)
*H04R 1/34* (2006.01)
(Continued)

(52) U.S. Cl.
CPC ........... *H04R 1/323* (2013.01); *G10K 11/004* (2013.01); *G10K 11/02* (2013.01); *G10K 11/355* (2013.01); *H04R 2499/15* (2013.01)

(58) Field of Classification Search
CPC . H04R 1/32; H04R 1/323; H04R 1/34; H04R 1/345; H04R 5/02; H04R 2499/15;
(Continued)

(56) References Cited

U.S. PATENT DOCUMENTS 1,976,379 A * 10/1934 Weinberger ............ G03B 31/00
352/36
2,643,727 A * 6/1953 Leon ...................... H04R 1/345
181/155

(Continued)

FOREIGN PATENT DOCUMENTS

CN 203368724 U * 12/2013 ............. H04R 1/025
CN 211930849 U * 11/2020 ............. H04R 1/345

(Continued)

OTHER PUBLICATIONS

International Search Report and English translation thereof dated Dec. 22, 2020 in connection with International Application No. PCT/JP2020/038471.

*Primary Examiner* — Edgardo San Martin
(74) *Attorney, Agent, or Firm* — Wolf, Greenfield & Sacks, P.C.

(57) ABSTRACT

This speaker system includes: a speaker device that is disposed outside a region of a projection surface on which a display surface of a display is projected, the speaker device functioning as a real sound source; and a reflector that has a reflection surface reflecting a sound output from the speaker device, the reflector localizing a sound image of a virtual sound source within the region of the projection surface. The reflector has an elliptical reflection surface in at least a part of the reflection surface. With this configuration, the sound output from the speaker device disposed outside the region of the projection surface is reflected on the reflector, and a sound image thereof is localized within the region of the projection surface, whereby it is possible to
(Continued)

bring a display position of a video into alignment with an output position of the sound. Thus, a comfortable viewing state can be ensured for a viewer.

17 Claims, 18 Drawing Sheets

(51) Int. Cl.

| | |
|---|---|
| ***H04R 5/02*** | (2006.01) |
| ***G10K 11/28*** | (2006.01) |
| ***G10K 11/00*** | (2006.01) |
| ***G10K 11/02*** | (2006.01) |
| ***G10K 11/35*** | (2006.01) |

(58) Field of Classification Search
CPC ...... G10K 11/004; G10K 11/18; G10K 11/20; G10K 11/26; G10K 11/28; G10K 11/35; G10K 11/355
See application file for complete search history.

(56) References Cited

U.S. PATENT DOCUMENTS

| | | | | | |
|---|---|---|---|---|---|
| 2,732,907 | A * | 1/1956 | Leon | H04R 1/345 | 181/175 |
| 4,190,739 | A * | 2/1980 | Torffield | H04R 1/345 | 381/160 |
| 4,823,908 | A * | 4/1989 | Tanaka | H04R 1/345 | 381/387 |
| 4,836,328 | A * | 6/1989 | Ferralli | H04R 1/345 | 381/160 |
| 5,031,220 | A * | 7/1991 | Takagi | B60R 11/0217 | 381/86 |
| 5,268,539 | A * | 12/1993 | Ono | G10K 11/28 | 181/155 |
| 5,532,438 | A * | 7/1996 | Brown | H04R 1/32 | 181/155 |
| 6,520,280 | B2 * | 2/2003 | Moskowitz | E04B 1/8218 | 181/143 |
| 8,162,099 | B2 * | 4/2012 | Nakaguro | B60R 11/00 | 181/204 |
| 10,241,740 | B2 * | 3/2019 | Seefeldt | H04R 1/403 | |
| 10,638,218 | B2 * | 4/2020 | Slack | H04R 3/14 | |
| 10,841,691 | B2 * | 11/2020 | Congard | H04R 1/347 | |
| 2005/0025318 | A1 * | 2/2005 | Sadaie | H04R 5/02 | 381/160 |
| 2010/0290659 | A1 * | 11/2010 | Tagami | H04R 1/345 | 381/352 |
| 2015/0042958 | A1 * | 2/2015 | Li | A61B 3/0041 | 353/7 |
| 2016/0219364 | A1 * | 7/2016 | Seefeldt | G06F 3/16 | |
| 2022/0060828 | A1 * | 2/2022 | Meyer | H04R 27/00 | |
| 2022/0225018 | A1 * | 7/2022 | Hayasaka | H04R 1/025 | |
| 2022/0394377 | A1 * | 12/2022 | Tipparaju | H04R 1/345 | |
| 2023/0009189 | A1 * | 1/2023 | Asada | H04R 7/04 | |

FOREIGN PATENT DOCUMENTS

| | | | | |
|---|---|---|---|---|
| DE | 102013002221 | A1 * | 8/2014 | H04R 1/345 |
| DE | 202020107120 | U1 * | 2/2021 | H04R 1/345 |
| FR | 2980663 | A1 * | 3/2013 | H04R 1/345 |
| FR | 3106461 | A3 * | 7/2021 | H04R 1/345 |
| GB | 887571 | A * | 1/1962 | |
| JP | H05-57998 | U | 7/1993 | |
| JP | H0715784 | A * | 1/1995 | |
| JP | 2000-010193 | A | 1/2000 | |
| JP | 2000134686 | A * | 5/2000 | |
| JP | 2010-268018 | A | 11/2010 | |
| JP | 2019-179074 | A | 10/2019 | |

* cited by examiner

SPEAKER SYSTEM AND SOUND OUTPUT METHOD

CROSS-REFERENCE TO RELATED APPLICATIONS

This application claims the benefit under 35 U.S.C. § 371 as a U.S. National Stage Entry of International Application No. PCT/JP2020/038471, filed in the Japanese Patent Office as a Receiving Office on Oct. 12, 2020, which claims priority to Japanese Patent Application Number JP2019-219363, filed in the Japanese Patent Office on Dec. 4, 2019, each of which is hereby incorporated by reference in its entirety.

TECHNICAL FIELD

The present technology relates to a technical field of a speaker system having a reflector that reflects a sound output from a speaker device and a sound output method.

BACKGROUND ART

There is a speaker system in which a sound output from a speaker device disposed on a rear surface side of a screen is transmitted through the screen and can be heard from a display surface side of the screen, and a screen used in such a speaker system is referred to as a transmissive screen (see, for example, Patent Document 1 and Patent Document 2). The transmissive screen is formed with, for example, a large number of small holes as sound transmission holes.

In the speaker system using such a transmissive screen, a viewer recognizes the sound output from the speaker device disposed on the rear surface side as if it is output from the display surface. Therefore, the display position of a video displayed on the display surface and the output position of a sound are brought into alignment with each other, whereby a comfortable viewing state without discomfort can be ensured for the viewer.

CITATION LIST

Patent Document

Patent Document 1: Japanese Patent Application Laid-Open No. 2000-10193

Patent Document 2: Japanese Patent Application Laid-Open No. 2019-179074

SUMMARY OF THE INVENTION

Problems to Be Solved By the Invention

Meanwhile, in recent years, videos and images are often displayed on a liquid crystal display, a light emitting diode (LED) display using an LED as a light source, or the like, and such a display is also used as a display device in, for example, a theater such as a movie theater.

However, the displays described above are difficult to be formed with a sound transmission hole, and therefore, the speaker device is located outside the outer periphery of the displays. Therefore, the display position of a video and the output position of a sound may not be brought into alignment with each other, and there is a possibility that a comfortable viewing state is not ensured for the viewer.

In view of this, an object of the speaker system and the sound output method according to the present technology is to achieve alignment between the display position of a video and the output position of a sound and to ensure a comfortable viewing state for the viewer.

Solutions to Problems

As a first aspect, a speaker system according to the present technology includes: a speaker device that is disposed outside a region of a projection surface on which a display surface of a display is projected, the speaker device functioning as a real sound source; and a reflector that has a reflection surface reflecting a sound output from the speaker device, the reflector localizing a sound image of a virtual sound source within the region of the projection surface, in which the reflector has an elliptical reflection surface in at least a part of the reflection surface.

With this configuration, the sound output from the speaker device disposed outside the region of the projection surface is reflected by the reflector, and a sound image of a virtual sound source is localized within the region of the projection surface.

As a second aspect, in the speaker system described above, it is desirable that the speaker device is disposed at or near one of focal points on the elliptical reflection surface.

With this configuration, the sound output from the speaker device and reflected by the elliptical reflection surface is easily collected at the other focal point on the elliptical reflection surface.

As a third aspect, in the speaker system described above, it is desirable that the reflector is disposed outside the region of the projection surface.

With this configuration, the speaker device and the reflector are less likely to enter the field of vision of a viewer viewing a video or an image displayed in the display surface.

As a fourth aspect, in the speaker system described above, it is desirable that the sound image of the virtual sound source is localized at a central part of the projection surface.

With this configuration, the sound is recognized as if it is output from the central part of the display surface of the display.

As a fifth aspect, in the speaker system described above, it is desirable that the speaker device and the reflector are disposed above the display.

With this configuration, the speaker device and the reflector are disposed at positions where it is easy to ensure a space, so that the speaker device and the reflector are less likely to be restricted in size and shape.

As a sixth aspect, in the speaker system described above, it is desirable that a midpoint between two focal points on the elliptical reflection surface is located outside the region of the projection surface.

With this configuration, the sound is easily propagated from the virtual sound source in a direction approaching the central part of the display surface.

As a seventh aspect, in the speaker system described above, it is desirable that the elliptical reflection surface has a major axis that is inclined with respect to the display surface.

With this configuration, the output direction of the sound from the virtual sound source can be set to a direction corresponding to the inclination direction of the major axis.

As an eighth aspect, in the speaker system described above, it is desirable that the virtual sound source is located at a position closer to the display surface with respect to the speaker device in a direction orthogonal to the display surface.

With this configuration, the distance between the virtual sound source and the display surface becomes smaller than the distance between the speaker device and the surface in the direction orthogonal to the display surface of the display.

As a ninth aspect, in the speaker system described above, it is desirable that a plurality of the reflectors is provided, the focal points of each of the plurality of reflectors coincide with each other, and the sound output from the speaker device is sequentially reflected by the elliptical reflection surfaces of the plurality of reflectors.

With this configuration, the sound image of the sound sequentially reflected by the elliptical reflection surfaces formed on the plurality of reflectors is localized within the region of the projection surface as a virtual sound source, whereby it is possible to locate the speaker device at a desired position according to the number of reflectors.

As a tenth aspect, in the speaker system described above, it is desirable that, in two of the reflectors that sequentially reflect the sound, a major axis of the elliptical reflection surface of one of the two reflectors and a major axis of the elliptical reflection surface of another one of the two reflectors are orthogonal to each other.

With this configuration, longitudinal directions of the two reflectors are orthogonal to each other.

As an eleventh aspect, it is desirable that, in the speaker system described above, a plurality of the reflectors is provided, and a plurality of the speaker devices is provided corresponding to the plurality of reflectors, the speaker system further including a delay circuit that synchronizes sounds output from the virtual sound sources respectively corresponding to the plurality of speaker devices.

With this configuration, the sounds output from the virtual sound sources corresponding to the respective speaker devices are synchronized by the delay circuit and reach the viewer.

As a twelfth aspect, in the speaker system described above, it is desirable that a plurality of the speaker devices and a plurality of the reflectors are disposed around the display.

With this configuration, sound images of sounds output from the plurality of speaker devices disposed around the display are localized within the region of the projection surface as one or a plurality of virtual sound sources.

As a thirteenth aspect, it is desirable that the speaker system described above further includes a parabolic reflective plate that has a parabolic reflection surface formed into a paraboloid shape, in which the sound output from the speaker device is reflected by the parabolic reflection surface toward the elliptical reflection surface.

With this configuration, the sound is reflected by the parabolic reflection surface and enters the elliptical reflection surface in a parallel or substantially parallel state.

As a fourteenth aspect, it is desirable that the speaker system described above further includes a shielding wall that shields a sound output from the speaker device and not reflected by the elliptical reflection surface.

With this configuration, a sound output from the speaker device and not reflected by the elliptical reflection surface is shielded by the shielding wall and is less likely to reach the viewer.

As a fifteenth aspect, in the speaker system described above, it is desirable that the speaker device is disposed on a rear side of the display, the reflector is disposed in an area from the rear side of the display to an outside of an outer periphery of the display, and the sound image of the virtual sound source is localized within the region of the projection surface due to the sound output from the speaker device being reflected twice by the elliptical reflection surface.

With this configuration, the speaker device is disposed at a position invisible from the viewer, so that the speaker device does not enter the field of vision of the viewer.

As a sixteenth aspect, in the speaker system described above, it is desirable that the elliptical reflection surface has a curvature that is variable, and the speaker device is changed in position according to displacement of a position of a focal point due to a change in curvature of the elliptical reflection surface.

With this configuration, the position of the virtual sound source at which the sound image is localized can be changed by changing the position of the speaker device.

As a seventeenth aspect, a sound output method according to the present technology includes: outputting a sound from a speaker device that is disposed outside a region of a projection surface on which a display surface of a display is projected, the speaker device functioning as a real sound source; and reflecting the sound output from the speaker device by an elliptical reflection surface formed on a reflector so as to localize a sound image of a virtual sound source within the region of the projection surface.

With this configuration, the sound output from the speaker device disposed outside the region of the projection surface is reflected by the reflector, and a sound image of a virtual sound source is localized within the region of the projection surface.

MODE FOR CARRYING OUT THE INVENTION

A mode for embodying the speaker system and the sound output method according to the present technology will be described below with reference to the accompanying drawings.

Coverage Angle of Speaker Device

Figure 1:
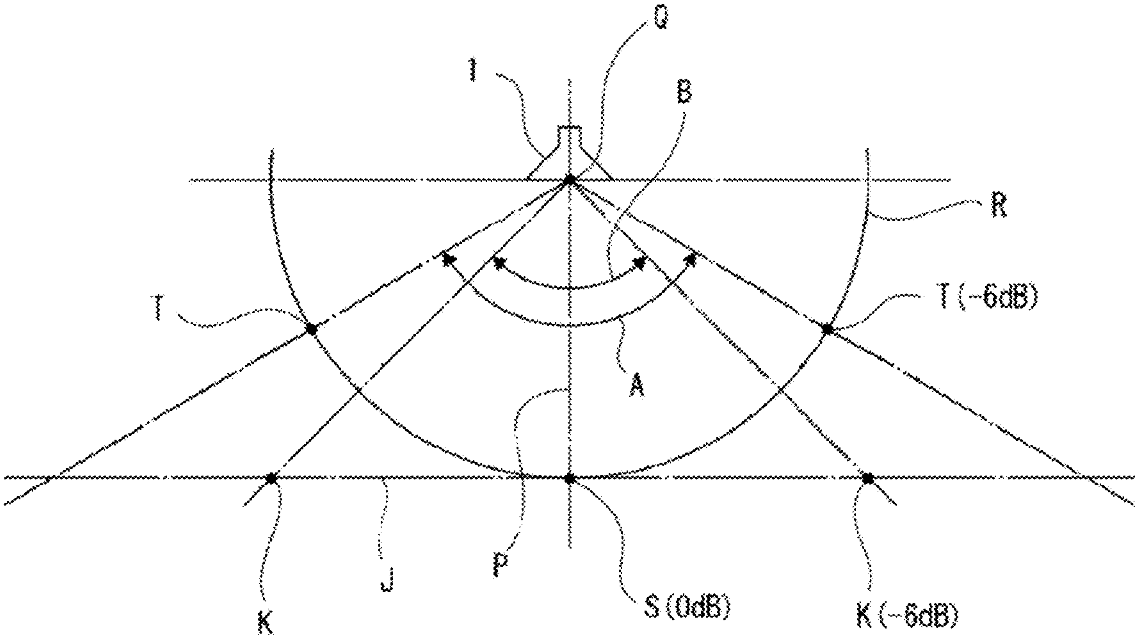
FIG. 1 illustrates an embodiment of a speaker system and a sound output method according to the present technology together with FIGS. 2 to 18, and is a diagram for describing a coverage angle of a speaker device.

First, the coverage angle of a speaker device 1 will be described (see FIG. 1).

In general, the nominal coverage angle of a speaker device can be obtained by measuring a sound pressure level on a 360 degree circumference when a constant electrical input is imparted.

The nominal coverage angle of the speaker device is defined as an "angle at which the sound pressure is 6 dB SPL (absolute value) lower than the on-axis sound pressure level" when the speaker device outputs a sound in the direction of an axis P, and the sound pressure level on a circumference R centered on an output position Q is measured. When a point intersecting with the axis P on the circumference R is defined as a reference point S and the sound pressure at the reference point S is defined as 0 dB, points T and T at which the sound pressure is 6 dB SPL lower than the sound pressure level at the reference point S on the circumference R are measured, and an angle between the points T and T across the reference point S is defined as a nominal coverage angle A. The nominal coverage angle A is smaller than 180 degrees. The nominal coverage angle A of the speaker device 1 is, for example, 120 degrees.

On the other hand, the effective coverage angle of a speaker device can be generally obtained by measuring a sound pressure level on a listening plane when a constant electrical input is imparted.

The effective coverage angle of the speaker device is defined as an "angle at which the sound pressure is 6 dB SPL (absolute value) lower than the on-axis sound pressure level" when the speaker device outputs a sound in the direction of the axis P, and the sound pressure level on a listening plane J is measured. When a point intersecting with the axis P on the listening plane J is defined as a reference point S and the sound pressure at the reference point S is defined as 0 dB, points K and K at which the sound pressure is 6 dB SPL lower than the sound pressure level at the reference point S on the listening plane J are measured, and an angle between the points K and K across the reference point S is defined as an effective coverage angle B. The effective coverage angle B is smaller than the nominal coverage angle A. The effective coverage angle B of the speaker device 1 is, for example 90 degrees.

Basic Configuration of Speaker System

Next, a basic configuration (first embodiment) of the speaker system will be described (see FIGS. 2 to 6).

Note that the following first to tenth embodiments describe an example in which the speaker system according to the present technology is applied to a speaker system used in a theater such as a movie theater. It is to be noted, however, that the speaker system according to the present technology is not limited to being applied to a speaker system used in a theater such as a movie theater, and can be widely applied to various speaker systems such as a speaker system used in home and a speaker system used in outdoor facility such as a stadium.

In addition, in the following description, the front-rear direction, the vertical direction, and the horizontal direction are indicated using the orientation of a display as a reference in a state where a listener is seated, and the direction in which the display surface of the display faces is defined as the front.

However, the front-rear direction, the vertical direction, and the horizontal direction described below are defined only for convenience, and they are not limited to the definitions described below when the present technology is embodied.

Figure 2:
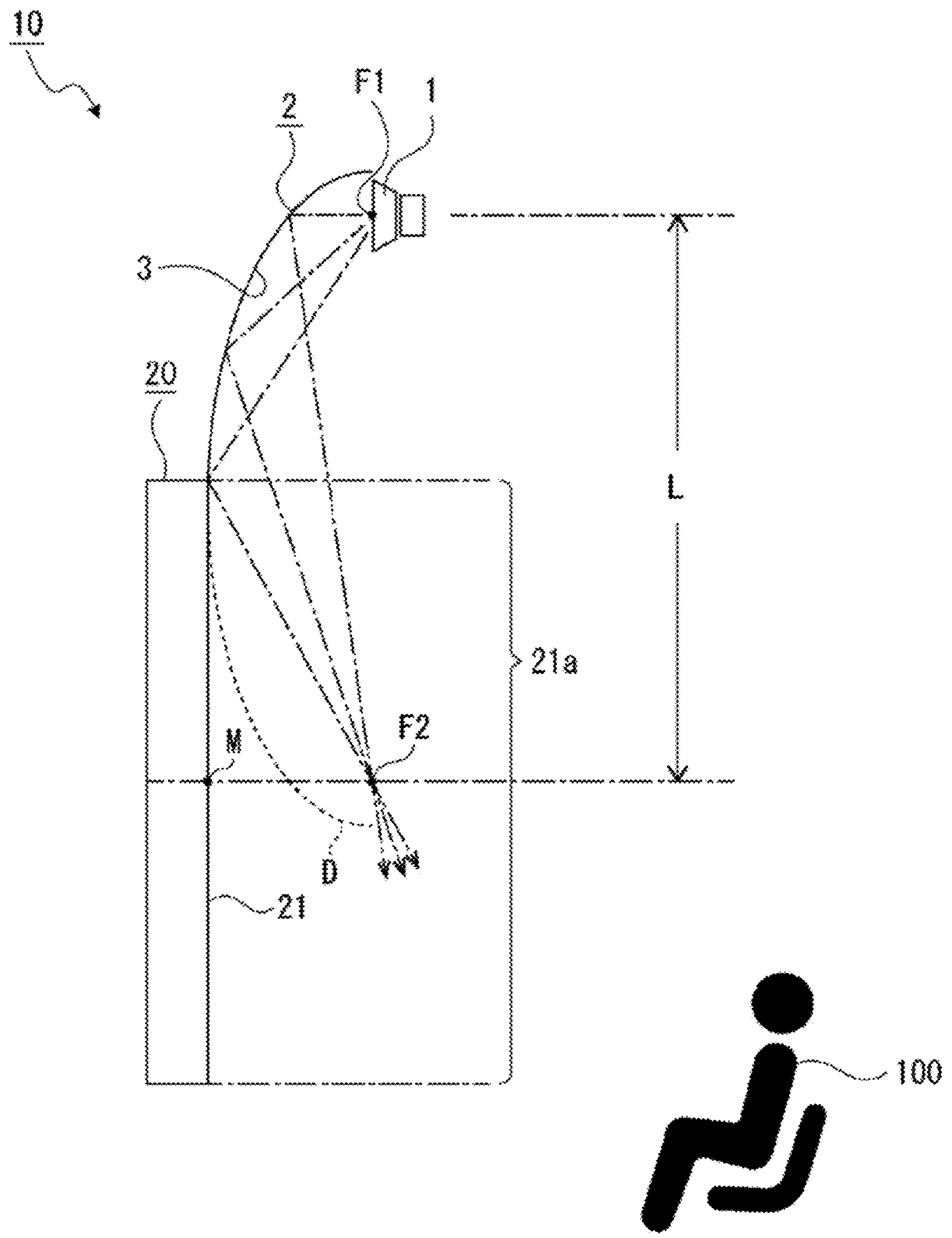
FIG. 2 is a diagram illustrating a basic configuration of a first embodiment.

A speaker system 10 includes the speaker device 1 and a reflector 2 and is used in a configuration including a display 20 (see FIG. 2).

The front surface of the display 20 is entirely formed, for example, as a display surface 21 on which a video or an image is displayed. However, the display surface 21 may be formed in a region other than the outer peripheral portion on the front surface of the display 20. A region in front of the display surface 21 is set as a projection surface 21*a* on which a video or an image is projected.

A viewer 100 views the video and the image displayed on the display surface 21 of the display 20 and listens to a sound output from the speaker device 1. The viewer 100 is located in front of the display 20.

The speaker device 1 functions as a real sound source that outputs a sound, and is disposed, for example, in an orientation so that the sound is output rearward.

The reflector 2 is disposed above the display 20, for example, and is located outside a region of the projection surface 21*a*. The reflector 2 is formed as an ellipsoid that is concave in the forward direction, and the entire inner surface is formed as an elliptical reflection surface 3. Note that the inner surface of the reflector 2 is formed as a reflection surface, and it is only sufficient that at least a part of the reflection surface is formed as the elliptical reflection surface 3, but a portion where the sound output from the speaker device 1 reaches is formed as the elliptical reflection surface 3.

The reflector 2 is disposed such that the major axis direction (direction connecting a focal point F1 and a focal point F2) extends along the vertical direction and the minor axis direction extends along the horizontal direction, and is formed in a shape smaller than a semi-ellipsoid, for example. Specifically, for example, the reflector 2 is formed into a shape having a size substantially half of a semi-ellipsoid. The lower end of the reflector 2 is aligned with the front end at the upper end of the display 20, for example.

Note that, in FIG. 2, the shape of the ellipsoid continuous with the reflector 2 is indicated by a dotted line as an elliptical virtual line D, two focal points of the ellipsoid are indicated as F1 and F2, and the focal length is indicated as L. The upper focal point F1 is outside the region of the projection surface 21*a*, and the lower focal point F2 is within the region of the projection surface 21*a*. The lower focal point F2 is located, for example, on a position directly in front of a central part M of the display surface 21.

The speaker device 1 is disposed at or near the upper focal point F1 of the reflector 2. Specifically, an output position of a sound output from the speaker device 1 is desirably located at or near the focal point F1. As described above, since the speaker device 1 is disposed at or near the upper focal point F1 of the reflector 2, the speaker device 1 is located outside the region of the projection surface 21*a*.

In the speaker system 10 configured as described above, when a sound is output from the speaker device 1 functioning as a real sound source, the output sound is reflected by the elliptical reflection surface 3 of the reflector 2, collected at the focal point F2, and propagated toward the viewer 100.

At this time, since the sound output from the speaker device 1 is collected at the focal point F2, the sound image of the sound is localized on the focal point F2, and a virtual sound source is formed at the focal point F2.

In particular, since the speaker device 1 is disposed at or near the focal point F1 on the elliptical reflection surface 3, the sound output from the speaker device 1 and reflected by the elliptical reflection surface 3 is easily collected at the focal point F2 on the elliptical reflection surface 3. Therefore, the sound image of the virtual sound source can be easily localized at a desired position.

Thus, the viewer 100 recognizes as if the sound output from the speaker device 1 is output from the central part of the display surface 21 of the display 20.

As described above, in the speaker system 10, the sound image of the virtual sound source is localized directly in front of the central part of the projection surface 21*a*, and therefore, the sound is recognized as if it is output from the central part of the display surface 21 of the display 20. Thus, the display position of the video displayed on the display surface 21 of the display 20 and the output position of the sound are brought into alignment with each other, whereby a comfortable viewing state without discomfort can be ensured.

In addition, the speaker device 1 and the reflector 2 are disposed above the display 20, so that the speaker device 1 and the reflector 2 are located at positions where it is easy to ensure a space. Thus, the speaker device 1 and the reflector 2 are less likely to be restricted in shape and size, and a degree of freedom in design can be improved.

Furthermore, due to the configuration in which the speaker device 1 and the reflector 2 are disposed above the display 20, the sound is easily transmitted obliquely downward and forward of the display 20, whereby a good sound listening state with a high sound pressure and high directivity for the listener 100 can be ensured.

However, the speaker device 1 is not limited to being disposed above the display 20, and may be disposed at any position as long as the speaker device 1 is located outside the region of the projection surface 21*a* outside the outer periphery of the display 20.

Due to the configuration in which the speaker device 1 is disposed outside the region of the projection surface 21*a* as described above, the speaker device 1 is less likely to enter the field of vision of the viewer 100 viewing the video and the image displayed on the display surface 21, whereby the visibility for the viewer 100 can be improved.

In addition, the reflector 2 is also not limited to being disposed above the display 20, and may be disposed at any position as long as the reflector 2 is located outside the region of the projection surface 21*a* outside the outer periphery of the display 20.

Due to the configuration in which the reflector 2 as well as the speaker device 1 is disposed outside the region of the projection surface 21*a* as described above, the speaker device 1 and the reflector 2 are less likely to enter the field of vision of the viewer 100 viewing the video and the image displayed on the display surface 21, whereby the visibility for the viewer 100 can be further improved.

Note that, although the above description indicates an example in which the focal point F2 at which the sound image is localized is positioned directly in front of the central part M of the display surface 21, the focal point F2 is not limited to being positioned directly in front of the central part M, and may be located at any position within the region of the projection surface 21*a*. The position of the focal point F2 can be set by appropriately changing the lengths of the major axis and the minor axis of the ellipsoid constituting the reflector 2, the positional relationship between the reflector 2 and the display 20, or the like.

In addition, the output angle (coverage angle) of the sound from the speaker device 1 is set, for example, within a range equal to or less than the nominal coverage angle. Therefore, the reflector 2 only needs to be formed in such a size that the elliptical reflection surface 3 reflects the sound output within a range equal to or less than the nominal coverage angle. Since the elliptical reflection surface 3 is formed to have a size for reflecting the sound output within a range equal to or less than the nominal coverage angle, the reflector 2 can be downsized, and the viewer 100 can listen to the sound at a high sound pressure.

It is to be noted, however, that the output angle of the sound from the speaker device 1 may be set within a range equal to or less than the effective coverage angle. In this case, the reflector 2 can be further downsized, and the viewer 100 can listen to the sound at a higher sound pressure.

Note that, when the sound is output rearward from the speaker device 1, a part of the output sound does not travel toward the elliptical reflection surface 3, but travels around the speaker device 1 and is propagated forward or obliquely downward and forward (see an arrow A), and may reach the viewer 100 earlier than the sound reflected by the elliptical reflection surface 3.

Figure 3:
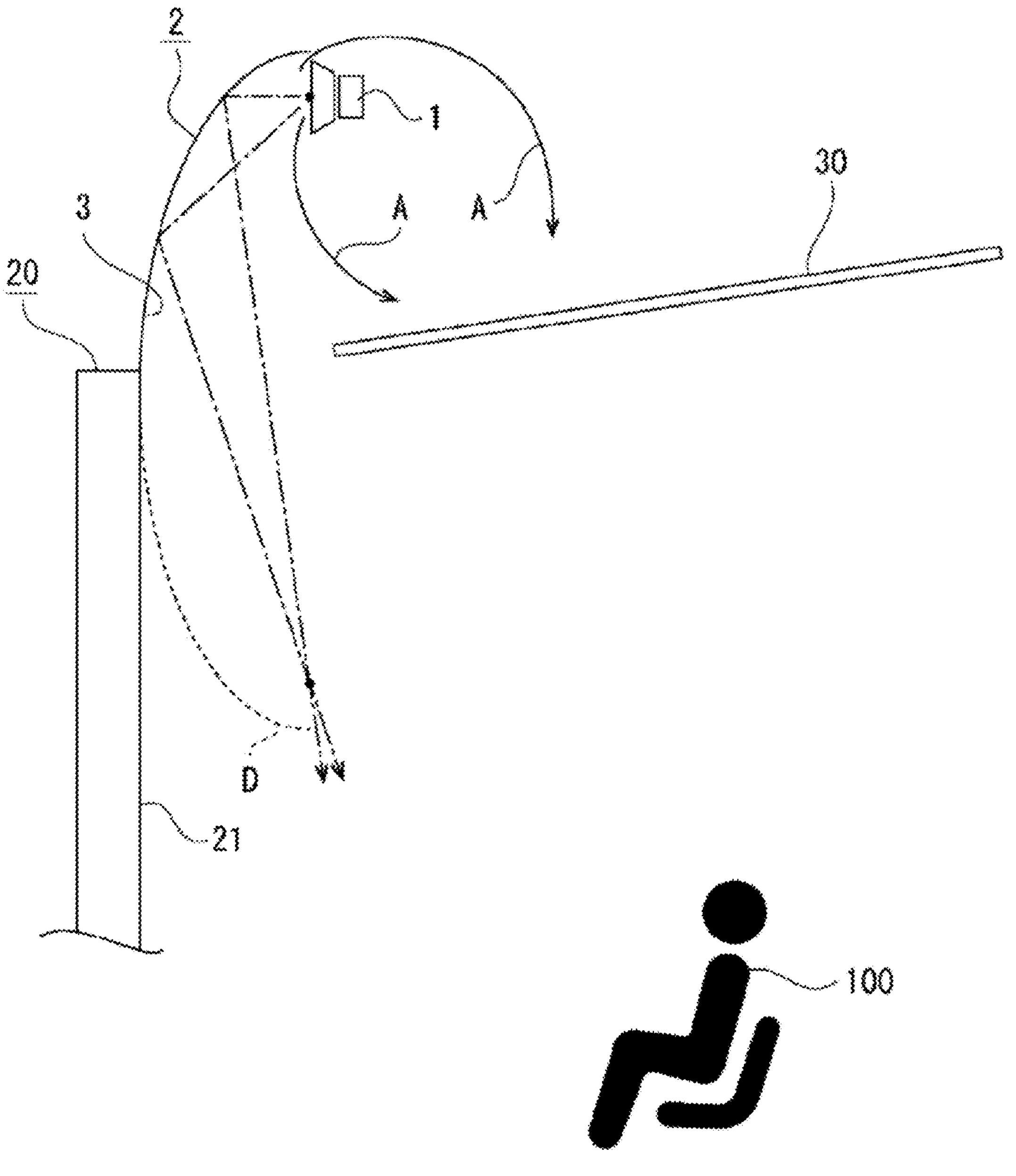
FIG. 3 is a diagram illustrating a configuration in which a shielding wall is provided in the first embodiment.
Figure 4:
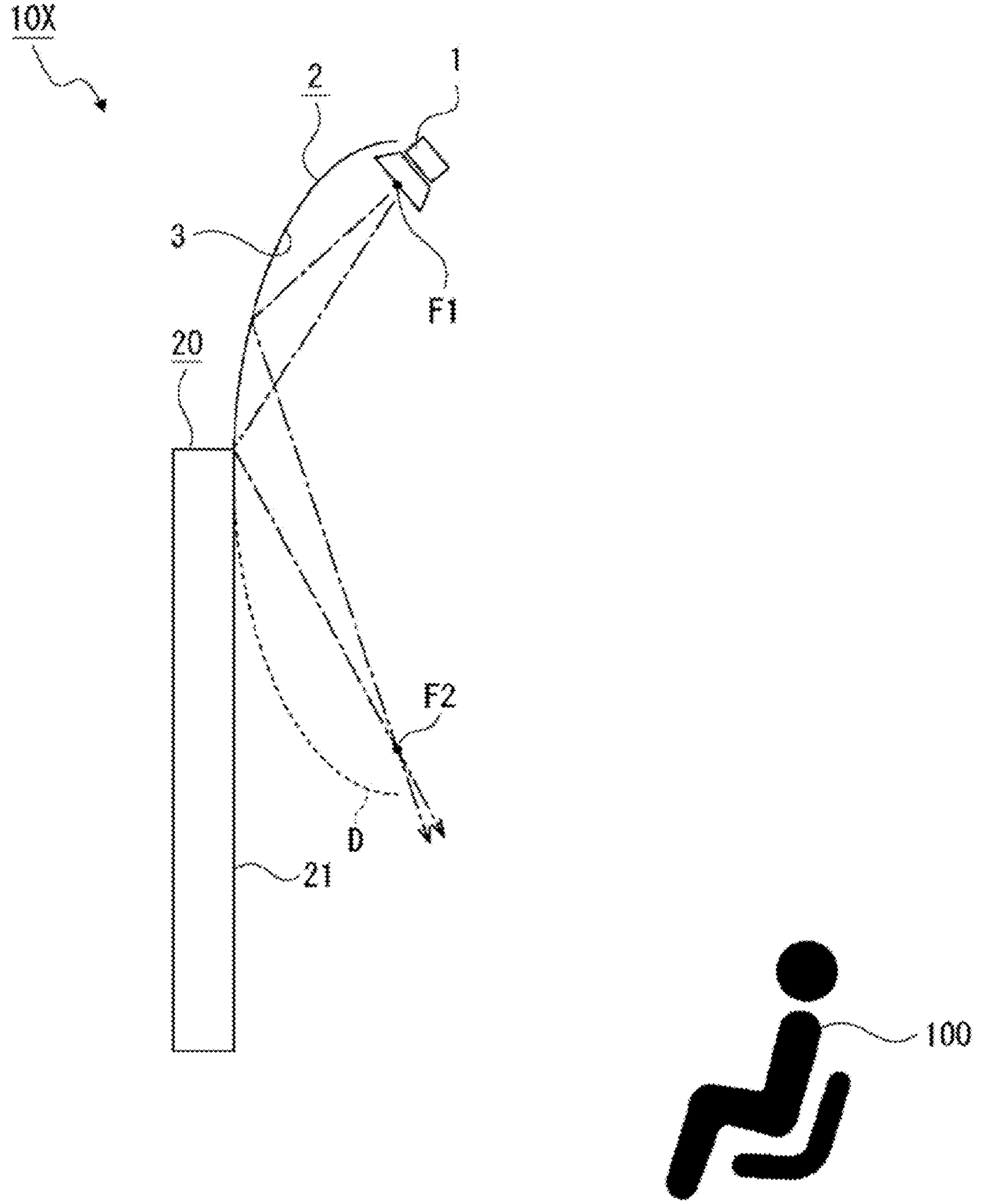
FIG. 4 is a diagram illustrating an example in which the speaker device has a different orientation in the first embodiment.

In that case, a shielding wall 30, for example, may be disposed at a position where the sound traveling around the speaker device 1 is propagated (see FIG. 3). The shielding wall 30 is disposed, for example, below the speaker device 1, and may also be disposed lateral to or in front of the speaker device 1.

Due to the configuration provided with the shielding wall 30 that shields a sound output from the speaker device 1 and not reflected by the elliptical reflection surface 3 as described above, the sound output from the speaker device 1 and not reflected by the elliptical reflection surface 3 is shielded by the shielding wall 30 and is less likely to reach the viewer 100. Therefore, the display position of the video displayed on the display 20 and the output position of the sound are brought into alignment with each other, whereby a comfortable viewing state without discomfort can be ensured.

Although the above description indicates, as an example, the speaker system 10 including the speaker device 1 disposed in an orientation so that a sound is output rearward, a speaker system 10X (see FIG. 4), for example, may be used that includes the speaker device 1 disposed in an orientation so that a sound is output rearward and obliquely downward.

Due to the configuration in which a sound is output rearward and obliquely downward from the speaker device 1, it is possible to propagate the sound in a necessary direction by effectively utilizing the elliptical reflection surface 3, even when the sound output from the speaker device 1 has a small output angle.

Furthermore, due to the configuration in which a sound is output rearward and obliquely downward from the speaker device 1, the speaker device 1 having a small sound output angle can be used, whereby it is possible to enlarge the range of choices of the usable speaker device 1.

Figure 5:
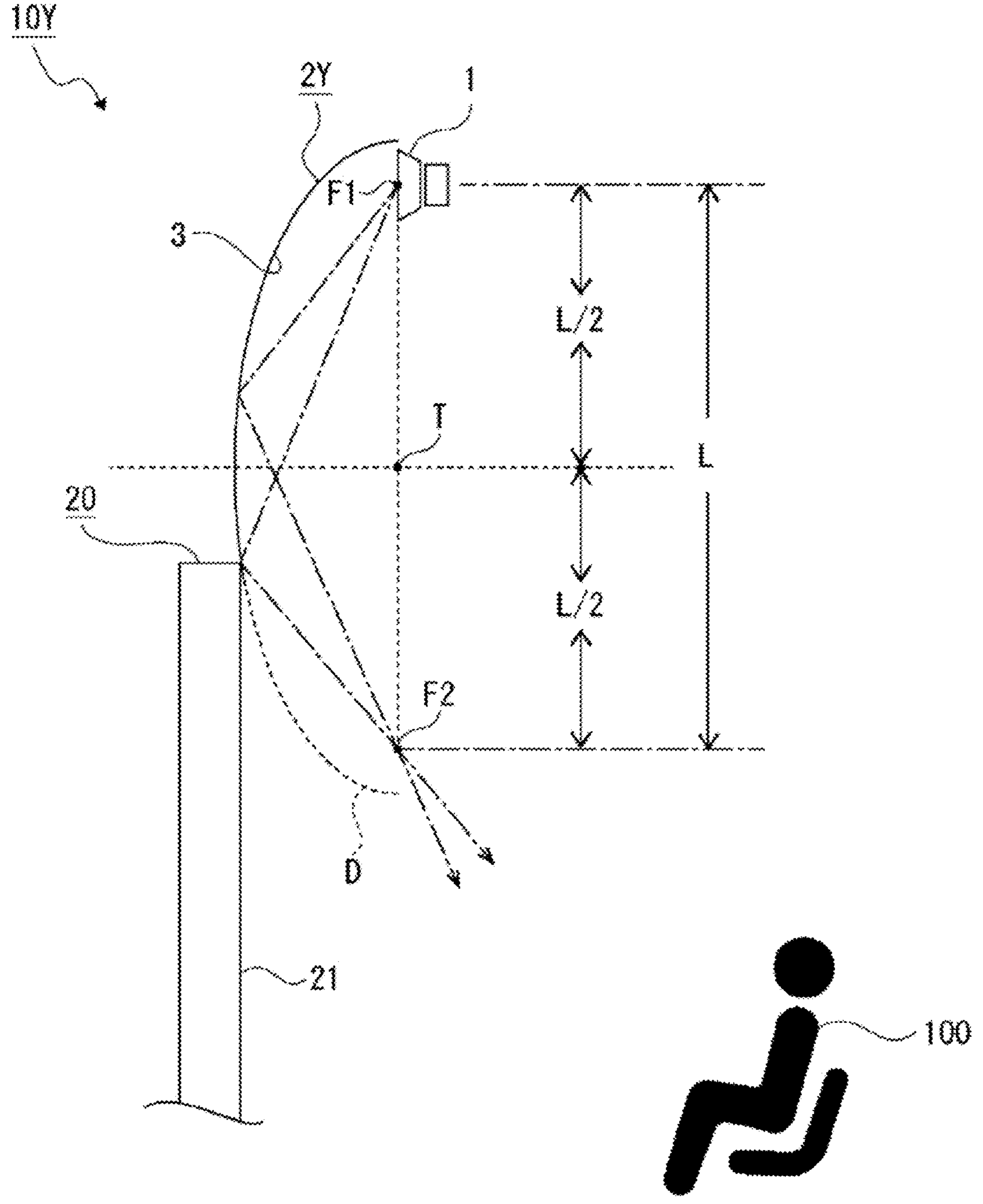
FIG. 5 is a diagram illustrating a configuration in which a midpoint of a focal length is positioned outside an outer periphery of a display in the first embodiment.

On the other hand, a speaker system 10Y may be used instead of the speaker system 10 so that the sound is propagated more upward from the virtual sound source (see FIG. 5).

The speaker system 10Y includes the speaker device 1 disposed in an orientation so that a sound is output rearward and a reflector 2Y which is larger than the reflector 2 of the speaker system 10 in size in the vertical direction. In the reflector 2Y, a midpoint T between the focal point F1 and the focal point F2 is positioned above the display 20, for example. Therefore, the elliptical reflection surface 3 has a large area in the major axis direction, so that a region where a sound can be reflected is large. Thus, a sound output at a larger angle is also reflected by the elliptical reflection surface 3 and collected at the focal point F2.

As described above, in the speaker system 10Y, the midpoint T between the focal point F1 and the focal point F2 on the elliptical reflection surface 3 is positioned outside the region of the projection surface 21*a*, whereby the sound is easily propagated upward from the virtual sound source as compared with a case where the sound is output rearward from the speaker device 1. Thus, the viewer 100 located on a higher position can listen to the sound with a high sound pressure.

Figure 6:
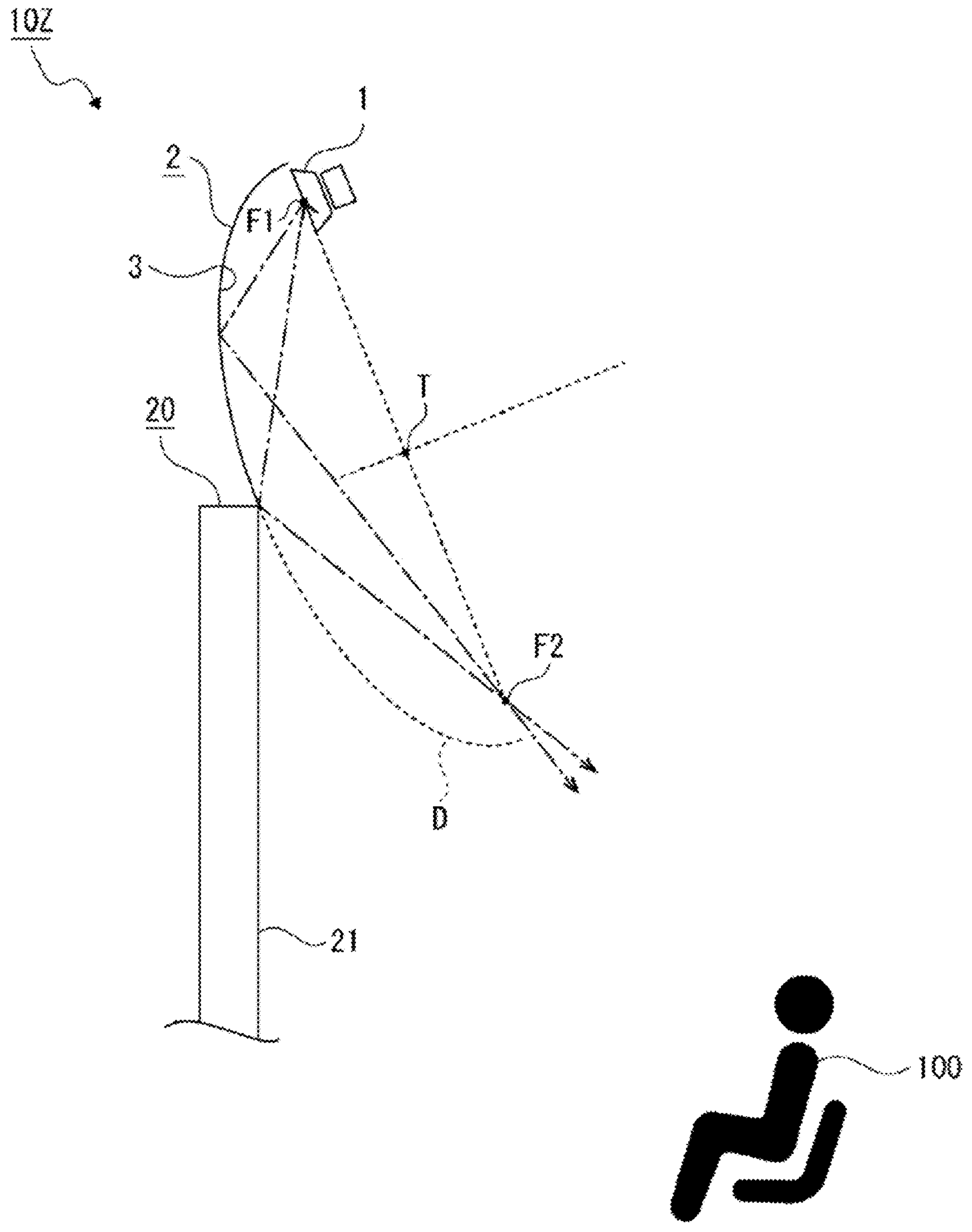
FIG. 6 is a diagram illustrating a configuration in which a reflector is inclined in the first embodiment.

In addition, in order to propagate the sound more upwardly from the virtual sound source as in the speaker system 10Y, a speaker system 10Z may be used (see FIG. 6).

In the speaker system 10Z, the reflector 2 is inclined so that the front side is raised with respect to the vertical direction, and the major axis is inclined so that the front side is raised with respect to the display 20. The speaker device 1 is disposed in an orientation so that a sound is output rearward and obliquely downward according to the inclination state of the reflector 2. Since the reflector 2 is inclined, a midpoint T between the focal point F1 and the focal point F2 is positioned, for example, above the display 20.

In the speaker system 10Z, the reflector 2 is inclined so that the front side is raised. Therefore, as in the speaker system 10Y, a sound is easily propagated upward from the virtual sound source as compared with the configuration in which a sound is output rearward from the speaker device 1, whereby the viewer 100 located on a higher position can listen to the sound at a high sound pressure.

In addition, the major axis of the elliptical reflection surface 3 is inclined with respect to the display surface 21 of the display 20, so that the sound from the virtual sound source can be output in a direction according to the inclination direction of the major axis. Thus, a satisfactory sound listening state can be ensured.

Speaker System According to Second Embodiment

Figure 7:
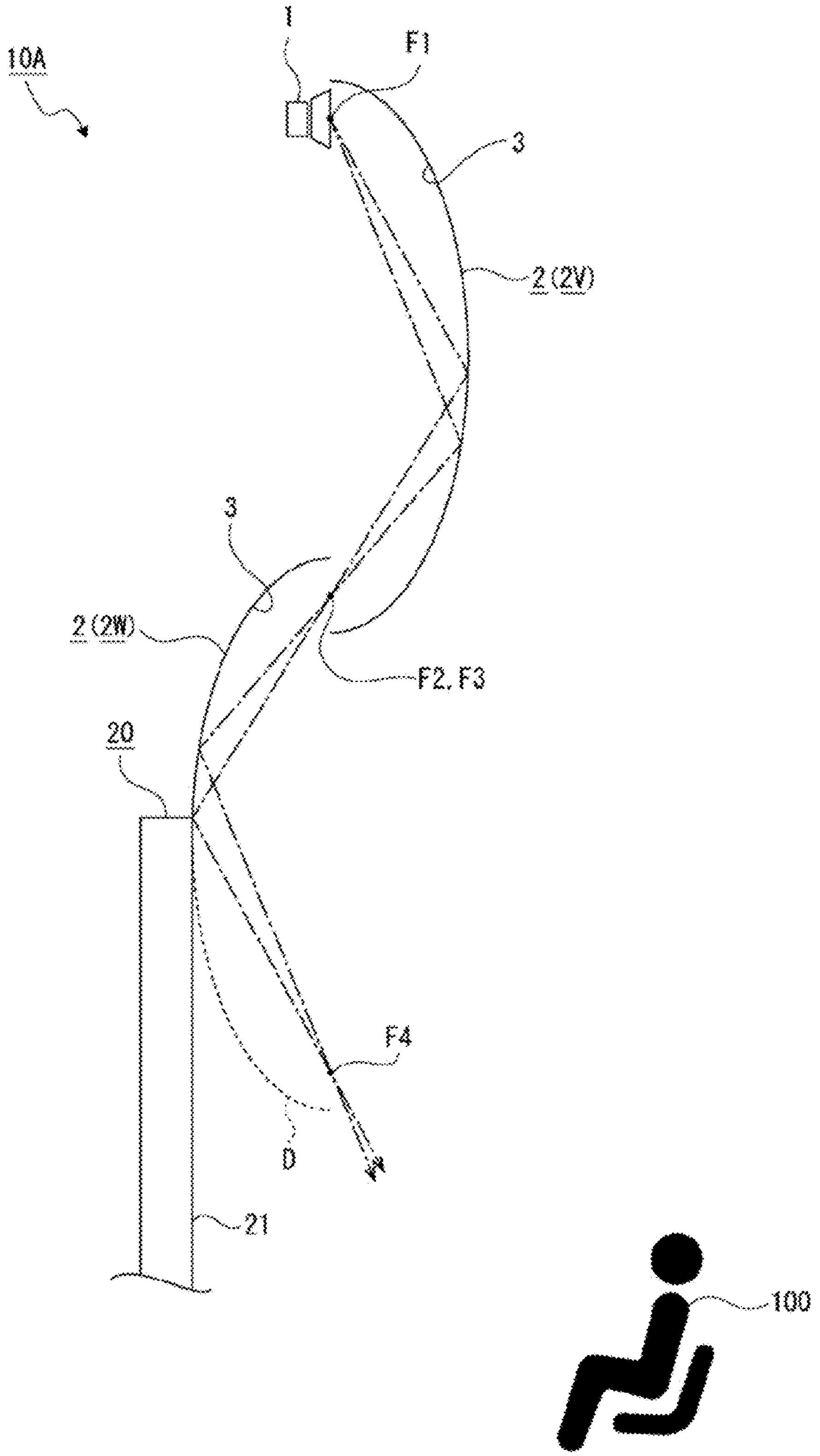
FIG. 7 is a diagram illustrating a second embodiment.

Next, a speaker system 10A according to a second embodiment will be described (see FIG. 7).

Note that, since the speaker system 10A according to the second embodiment has the same basic configuration as the speaker system 10 according to the first embodiment, only differences from the speaker system 10 according to the first embodiment will be described in detail (the same applies to the following description of speaker systems according to third to tenth embodiments).

The speaker system 10A includes a speaker device 1 and a plurality of reflectors 2, for example, two reflectors 2 and 2.

The speaker device 1 is disposed in an orientation so that a sound is output forward.

Both the reflectors 2 and 2 are disposed above a display 20 and are located outside the region of a projection surface 21*a*. The reflectors 2 and 2 are vertically displaced from each other. The upper reflector 2 is defined as a reflector 2V, and the lower reflector 2 is defined as a reflector 2W. The reflector 2V is provided as a semi-ellipsoid, and the reflector 2W is formed to have a size approximately half of the size of the semi-ellipsoid.

The reflector 2V is formed into a shape concave in the rearward direction, and the reflector 2W is formed into a shape concave in the forward direction. The lower end of the reflector 2V and the upper end of the reflector 2W are on the same position in the vertical direction and the horizontal direction, and the lower end of the reflector 2V is located in front of the upper end of the reflector 2W. Both the reflector 2V and the reflector 2W are disposed in an orientation in which the major axis direction coincides with the vertical direction.

When upper and lower focal points of the reflector 2V are defined as F1 and F2, respectively, and upper and lower focal points of the reflector 2W are defined as F3 and F4, respectively, the lower focal point F2 of the reflector 2V and the upper focal point F3 of the reflector 2W coincide with each other.

The speaker device 1 is disposed at or near the upper focal point F1 of the reflector 2V, and located outside the region of the projection surface 21*a*.

In the speaker system 10A configured as described above, when a sound is output from the speaker device 1, the output sound is reflected by an elliptical reflection surface 3 of the reflector 2V, collected at the focal point F2 (focal point F3), reflected by an elliptical reflection surface 3 of the reflector 2W, collected at the focal point F4, and propagated toward a viewer 100.

At this time, since the sound output from the speaker device 1 is collected at the focal point F4, the sound image of the sound is localized on the focal point F4, and a virtual sound source is formed at the focal point F4.

Therefore, the viewer 100 recognizes as if the sound output from the speaker device 1 is output from a display surface 21 of the display 20.

As described above, the speaker system 10A includes the plurality of reflectors 2, the focal points of each of the plurality of reflectors coincide with each other, and the sound output from the speaker device 1 is sequentially reflected by the elliptical reflection surfaces 3 of the plurality of reflectors 2.

Therefore, the sound image of the sound sequentially reflected by the elliptical reflection surfaces 3 formed on the plurality of reflectors 2 is localized within the range of the projection surface 21*a* as a virtual sound source, whereby it is possible to locate the speaker device 1 at a desired position according to the number of reflectors 2. Thus, a degree of freedom in design regarding the arrangement position of the speaker device 1 can be improved.

Note that, although the example in which the two reflectors 2 and 2 are disposed has been described above, three or more reflectors 2, 2, . . . may be disposed in the speaker system 10A. In this case, first focal points of the reflectors 2, 2, . . . on which the sound is sequentially reflected coincides with each other.

Speaker System According to Third Embodiment

Figure 8:
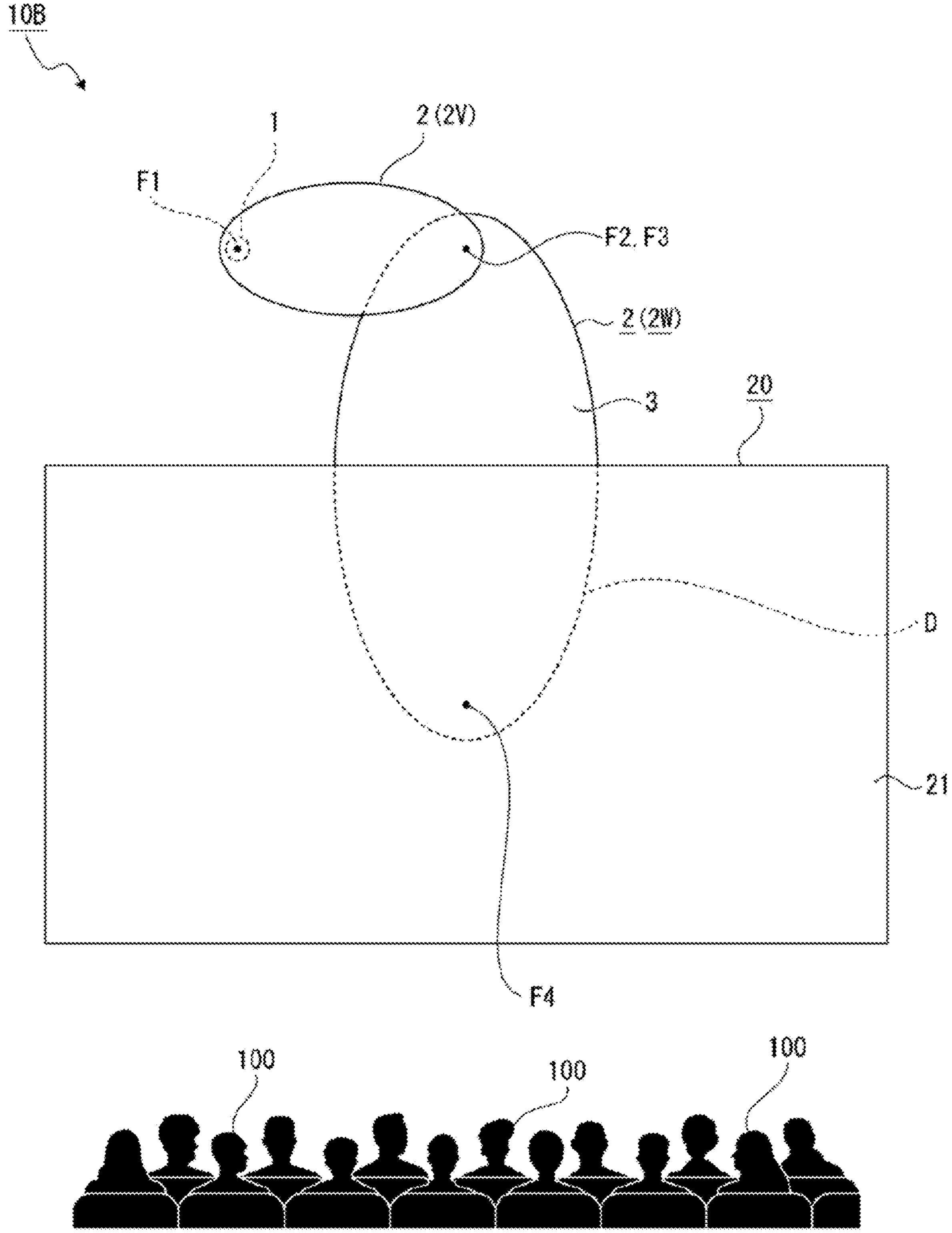
FIG. 8 is a diagram illustrating a third embodiment.

Next, a speaker system 10B according to a third embodiment will be described (see FIG. 8).

The speaker system 10B includes a speaker device 1 and a plurality of reflectors 2, for example, two reflectors 2 and 2.

The speaker device 1 is disposed in an orientation so that a sound is output forward.

Both the reflectors 2 and 2 are disposed above a display 20 and are located outside the region of a projection surface 21*a*. The reflectors 2 and 2 are horizontally displaced from each other. One of the reflectors 2 and 2 is defined as a reflector 2V, and the other is defined as a reflector 2W. The reflector 2V is provided as a semi-ellipsoid, and the reflector 2W is formed to have a size approximately half of the size of the semi-ellipsoid.

The reflector 2V is formed into a shape concave in the rearward direction, and the reflector 2W is formed into a shape concave in the forward direction. A first end of the reflector 2V in the horizontal direction and the upper end of the reflector 2W are on the same position in the vertical direction and the horizontal direction, and the first end of the reflector 2V in the horizontal direction is located in front of the upper end of the reflector 2W. The reflector 2V is disposed in an orientation in which the major axis direction coincides with the horizontal direction, and the reflector 2W is disposed in an orientation in which the major axis direction coincides with the vertical direction.

When left and right focal points of the reflector 2V are defined as F1 and F2, respectively, and upper and lower focal points of the reflector 2W are defined as F3 and F4, respectively, the focal point F2 of the reflector 2V and the upper focal point F3 of the reflector 2W coincide with each other.

The speaker device 1 is disposed at or near the focal point F1 of the reflector 2V and is located outside the region of the projection surface 21*a*.

In the speaker system 10B configured as described above, when a sound is output from the speaker device 1, the output sound is reflected by an elliptical reflection surface 3 of the reflector 2V, collected at the focal point F2 (focal point F3), reflected by an elliptical reflection surface 3 of the reflector 2W, collected at the focal point F4, and propagated toward a viewer 100.

At this time, since the sound output from the speaker device 1 is collected at the focal point F4, the sound image of the sound is localized on the focal point F4, and a virtual sound source is formed at the focal point F4.

Therefore, the viewer 100 recognizes as if the sound output from the speaker device 1 is output from a display surface 21 of the display 20.

As described above, the speaker system 10B includes the plurality of reflectors 2, and the sound output from the speaker device 1 is sequentially reflected by the elliptical reflection surfaces 3 of the plurality of reflectors 2.

Therefore, the sound image of the sound sequentially reflected by the elliptical reflection surfaces 3 formed on the plurality of reflectors 2 is localized within the range of the projection surface 21*a* as a virtual sound source, whereby it is possible to locate the speaker device 1 at a desired position according to the number of reflectors 2. Thus, a degree of freedom in design regarding the arrangement position of the speaker device 1 can be improved.

In addition, the two reflectors 2 and 2 that sequentially reflect the sound are disposed in such a manner that the major axis of the elliptical reflection surface 3 of one of the reflectors 2 and the major axis of the elliptical reflection surface 3 of another one of the reflectors 2 are orthogonal to each other, so that the longitudinal directions of the two reflectors 2 and 2 are orthogonal to each other. Thus, the space for the reflectors 2 and 2 can be reduced.

Note that, although the example in which the two reflectors 2 and 2 are disposed has been described above, three or more reflectors 2, 2, . . . may be disposed in the speaker system 10B. In this case, first focal points of the reflectors 2, 2, . . . that sequentially reflect a sound coincide with each other, and the major axis directions of the reflectors 2, 2, . . . that sequentially reflect the sound are orthogonal to each other.

Speaker System According to Fourth Embodiment

Figure 9:
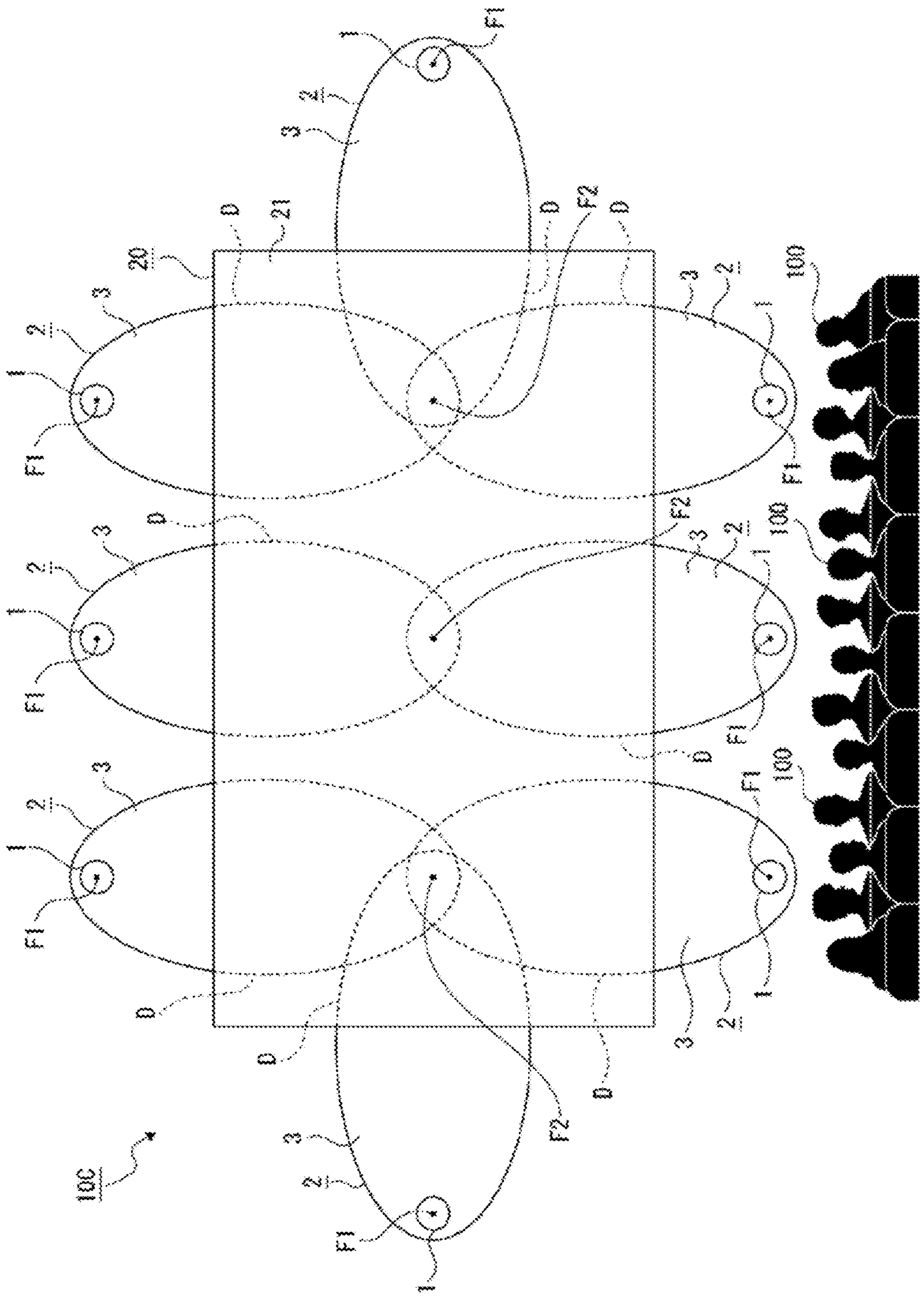
FIG. 9 is a diagram illustrating a fourth embodiment.

Next, a speaker system 10C according to a fourth embodiment will be described (see FIG. 9).

The speaker system 10C includes a plurality of speaker devices 1, 1, . . . and a plurality of reflectors 2, 2, . . .

The speaker devices 1 are disposed in an orientation so that a sound is output rearward.

The reflectors 2, 2, . . . are disposed outside the outer periphery of a display 20, and are located outside the region of a projection surface 21*a*. The reflectors 2, 2, . . . are disposed, for example, above the display 20, below the display 20, and on both sides of the display 20 in the horizontal direction so as to be vertically and horizontally symmetrical.

Each reflector 2 is formed into a shape concave in the forward direction. The reflectors 2, 2, . . . disposed above and below the display 20 are disposed in an orientation in which the major axis directions coincide with the vertical direction, and the reflectors 2 and 2 disposed on both sides of the display 20 in the horizontal direction are disposed in an orientation in which the major axis directions coincide with the horizontal direction.

When focal points of the reflectors 2, 2, . . . located outside the outer periphery of the display 20 are defined as F1, F1, . . . , respectively, and focal points located inside the outer periphery of the display 20 are defined as F2, F2, . . . , respectively, the focal points F2 of the reflectors 2, 2, . . . located above the display 20 and the focal points F2 of the reflectors 2, 2, . . . located below the display 20 coincide with each other, and the focal points F2 of the reflectors 2 and 2 located on both sides of the display 20 in the horizontal direction coincide with the focal points F2 of the reflectors 2, 2, . . . located above and below the display 20.

In the speaker system 10C configured as described above, when sounds are output from the speaker devices 1, 1, . . . , the output sounds are reflected by elliptical reflection surfaces 3, 3, . . . of the reflectors 2, 2, . . . , collected at the focal points F2, F2, and F2, and propagated toward a viewer 100.

At this time, since the sounds output from the speaker devices 1, 1, . . . are collected at the three focal points F2, F2, and F2, the sound images of the sounds are localized on the focal points F2, F2, and F2, respectively. Therefore, virtual sound sources are respectively formed at the focal points F2, F2, and F2.

Thus, the viewer 100 recognizes as if the sounds output from the speaker devices 1, 1, . . . are output from a display surface 21 of the display 20.

As described above, in the speaker system 10C, a plurality of reflectors 2 and a plurality of speaker devices 1 are disposed around the display 20.

Therefore, sound images of sounds output from the plurality of speaker devices 1 disposed around the display 20 are localized within the region of the projection surface 21*a*, and thus, virtual sound sources can be respectively formed at a plurality of positions, and improvement of sound pressure and sound output from a wide range can be achieved.

Note that, although the example in which sound images of sounds are localized at three positions has been described above, the position and number at which a sound image of a sound is localized can be freely set depending on the number, orientation, and the like of the reflectors 2.

In particular, in movie theaters and the like, a total of three speakers including a center speaker and left and right side speakers or a total of five speakers are often used, and due to the configuration described above in which virtual sound sources are formed at a plurality of positions, a surround-sound system similar to a case of using such a plurality of speakers can be achieved.

Speaker System According to Fifth Embodiment

Figure 10:
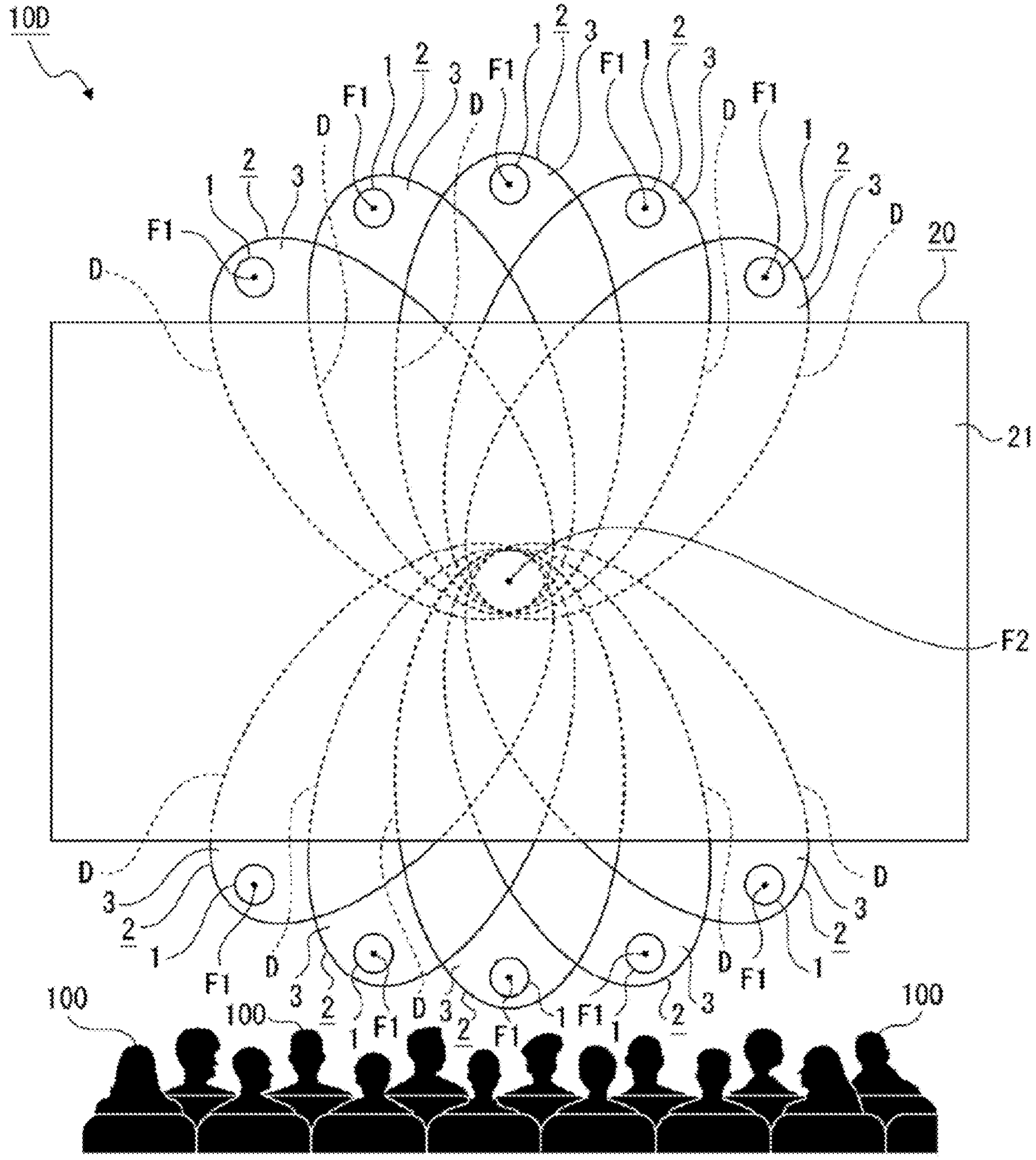
FIG. 10 is a diagram illustrating a fifth embodiment.

Next, a speaker system 10D according to a fifth embodiment will be described (see FIG. 10).

The speaker system 10D includes a plurality of speaker devices 1, 1, . . . and a plurality of reflectors 2, 2, . . .

The speaker devices 1 are disposed in an orientation so that a sound is output rearward.

The reflectors 2, 2, . . . are disposed outside the outer periphery of a display 20, and are located outside the region of a projection surface 21*a*. The reflectors 2, 2, . . . are disposed, for example, above the display 20 and below the display 20 so as to be vertically and horizontally symmetrical.

Each reflector 2 is formed into a shape concave in the forward direction. The reflectors 2, 2, . . . disposed above and below the display 20 are placed in such a manner that the major axis directions are different from each other and the inclination angles or inclination directions of the major axis directions sequentially vary in the horizontal direction. Specifically, the major axis direction of the reflector 2 located at the center in the horizontal direction coincides with the vertical direction, and the inclination angles of the major axis directions of the reflectors 2, 2, . . . except for the reflector 2 located at the center in the horizontal direction increase with distance from the reflector 2 located at the center in the horizontal direction. The reflectors 2, 2, . . . are disposed such that the inclination directions of the reflectors 2, 2, . . . are horizontally symmetrical with respect to the reflector 2 located at the center in the horizontal direction.

When focal points of the reflectors 2, 2, . . . located outside the outer periphery of the display 20 are defined as F1, F1, . . . , respectively, and focal points located inside the outer periphery of the display 20 are defined as F2, F2, . . . , respectively, the focal points F2, F2, . . . of all the reflectors 2, 2, . . . coincide with each other, and the focal points F2, F2, . . . coinciding with each other are located directly in front of the central part of the projection surface 21*a*, for example.

In the speaker system 10D configured as described above, when sounds are output from the speaker devices 1, the output sounds are reflected by elliptical reflection surfaces 3 of the reflectors 2, collected at the focal points F2, and propagated toward a viewer 100.

At this time, since the sounds output from the speaker devices 1, 1, . . . are collected at the focal points F2, the sound images of the sounds are localized on the focal points F2, and a virtual sound source is formed at the focal points F2.

Thus, the viewer 100 recognizes as if the sounds output from the speaker devices 1, 1, . . . are output from a display surface 21 of the display 20.

As described above, in the speaker system 10D, a plurality of reflectors 2 and a plurality of speaker devices 1 are disposed around the display 20.

Therefore, sound images of sounds output from the plurality of speaker devices 1 disposed around the display 20 are localized within the region of the projection surface 21*a* as one virtual sound source, and thus, the sound pressure can be improved.

Speaker System According to Sixth Embodiment

Figure 11:
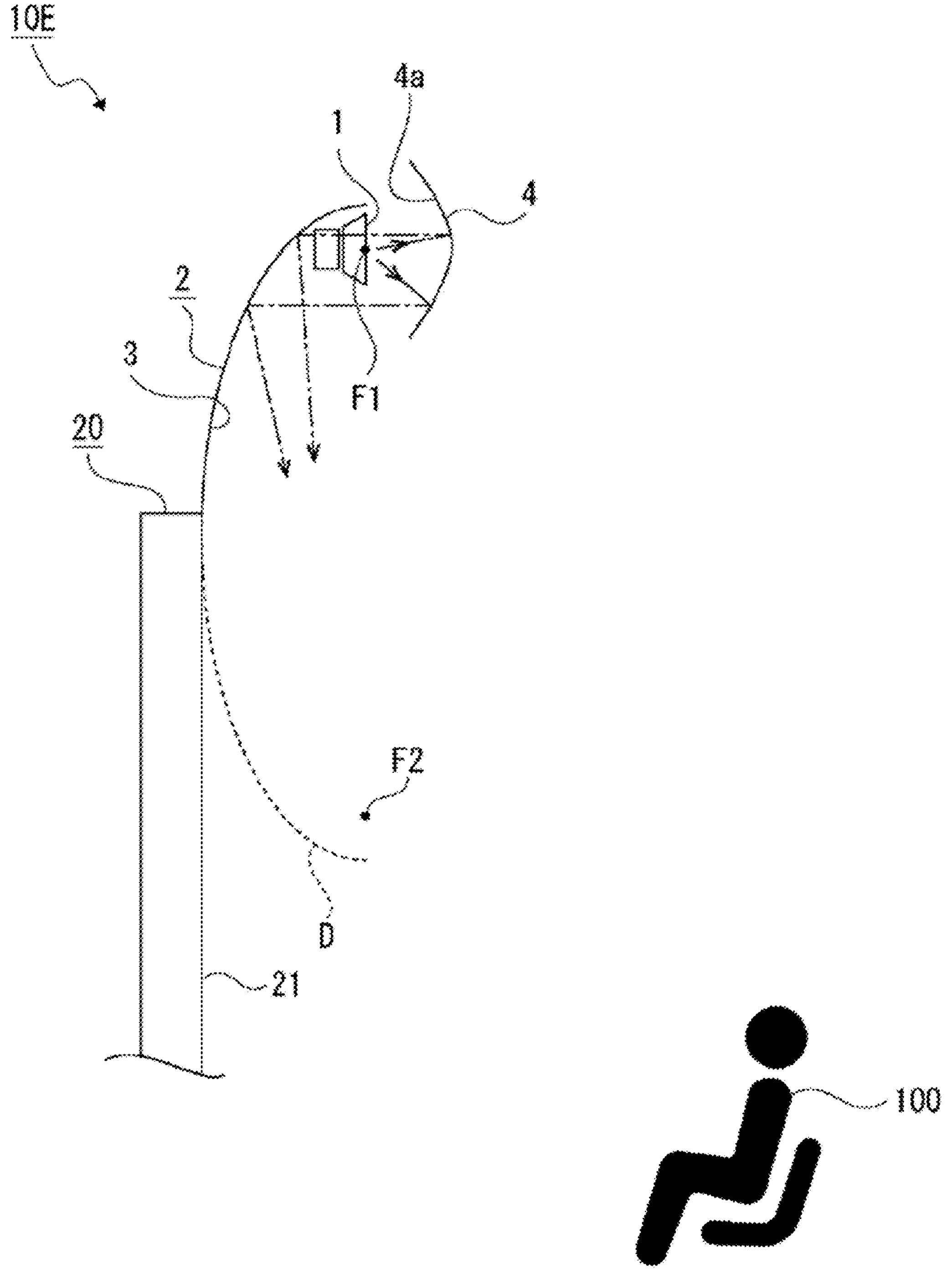
FIG. 11 is a diagram illustrating a sixth embodiment.

Next, a speaker system 10E according to a sixth embodiment will be described (see FIG. 11).

The speaker system 10E includes a speaker device 1, a reflector 2, and a parabolic reflective plate 4.

The speaker device 1 is disposed in an orientation so that a sound is output forward.

The reflector 2 is disposed above the display 20 and is located outside the region of a projection surface 21*a*. The reflector 2 is formed into a shape concave in the forward direction, and is disposed in an orientation in which the major axis direction coincides with the vertical direction.

The speaker device 1 is disposed at or near an upper focal point F1 of the reflector 2, and is located outside the region of the projection surface 21*a*.

The parabolic reflective plate 4 is formed into a shape concave in the rearward direction, and has an inner surface formed as a parabolic reflection surface 4*a*. The parabolic reflective plate 4 is disposed in front of the speaker device 1.

In the speaker system 10E configured as described above, when a sound is output from the speaker device 1, the output sound is reflected by the parabolic reflection surface 4*a* of the parabolic reflective plate 4, and travels toward an elliptical reflection surface 3 of the reflector 2 in a parallel or substantially parallel state. The sound reflected by the parabolic reflection surface 4*a* is reflected by the elliptical reflection surface 3 of the reflector 2, collected at a focal point F2, and propagated toward a viewer 100.

At this time, since the sound output from the speaker device 1 is collected at the focal point F2, the sound image of the sound is localized on the focal point F2, and a virtual sound source is formed at the focal point F2.

Therefore, the viewer 100 recognizes as if the sound output from the speaker device 1 is output from a display surface 21 of a display 20.

As described above, the speaker system 10E is provided with the parabolic reflective plate 4 that has the parabolic reflection surface 4*a* formed into a paraboloid shape, so that a sound output from the speaker device 1 is reflected by the parabolic reflection surface 4*a* toward the elliptical reflection surface 3.

Therefore, the sound is reflected by the parabolic reflection surface 4*a* and is incident on the elliptical reflection surface 3 in a parallel or substantially parallel state, whereby high directivity can be ensured and attenuation of sound pressure can be suppressed.

In addition, the linearity of the sound is enhanced, whereby the sound is less likely to attenuate. Thus, the speaker device 1 can propagate the sound a long distance with a small output.

Speaker System According to Seventh Embodiment

Figure 12:
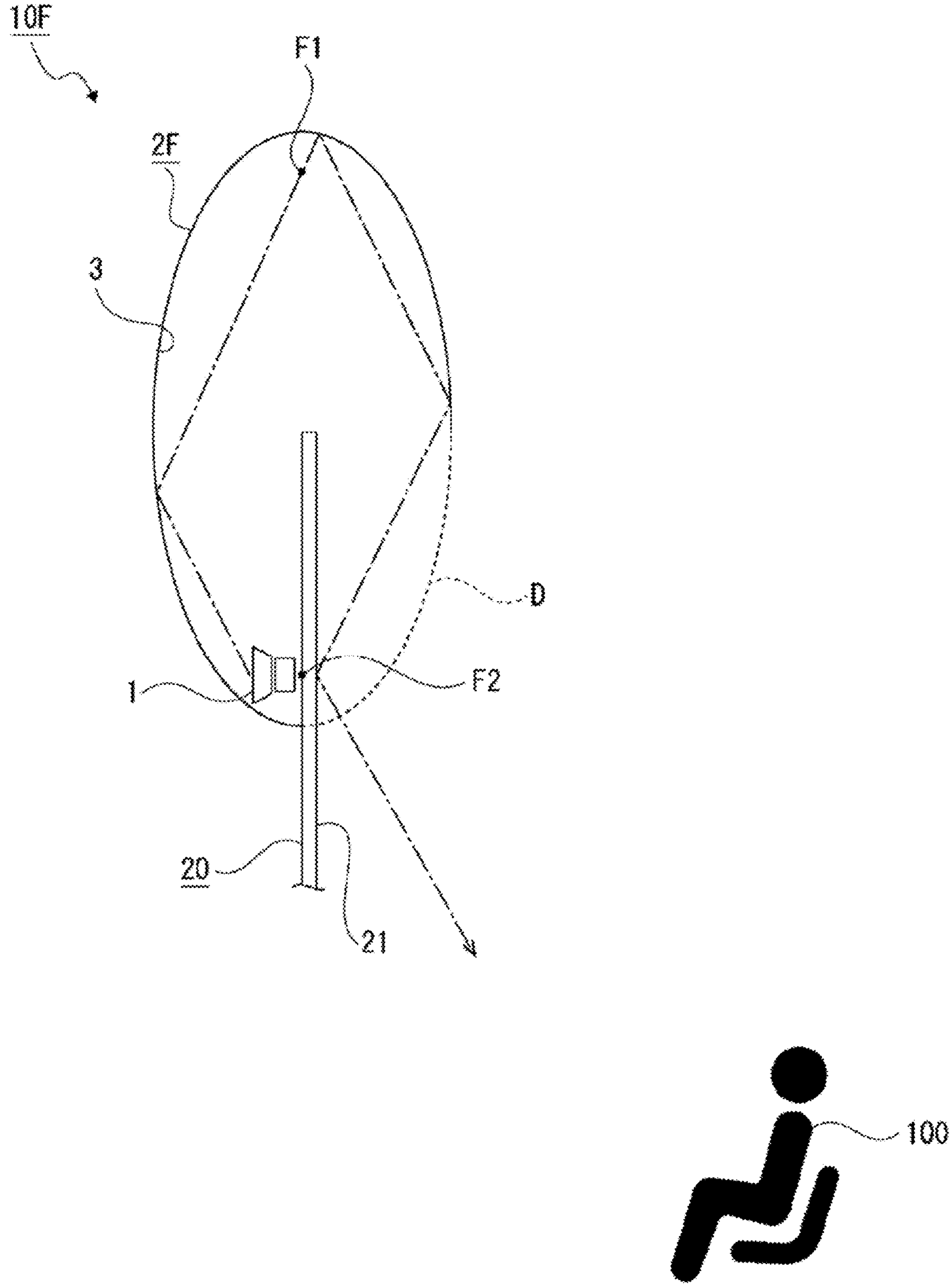
FIG. 12 is a diagram illustrating a seventh embodiment.

Next, a speaker system 10F according to a seventh embodiment will be described (see FIG. 12).

The speaker system 10F includes a speaker device 1 and a reflector 2F.

The speaker device 1 is disposed in an orientation so that a sound is output rearward.

The reflector 2F is disposed to extend from an area above a display 20 to an area on the rear side of the display 20, and is located outside the region of a projection surface 21*a*. The reflector 2F is formed in a shape having nearly three-quarters of an ellipsoid, and is disposed so that the major axis direction extends along the vertical direction and the minor axis direction extends along the front-rear direction.

The speaker device 1 is disposed at or near a lower focal point F2 of the reflector 2F. The speaker device 1 is disposed on the rear side of the display 20 and is located outside the region of the projection surface 21*a*.

In the speaker system 10F configured as described above, when a sound is output from the speaker device 1, the output sound is reflected by an elliptical reflection surface 3 of the reflector 2F, collected at a focal point F1, reflected again by the elliptical reflection surface 3 to travel toward a display surface 21 of the display 20, and is collected at or near the focal point F2. The sound collected at or near the focal point F2 is reflected by the display surface 21 and propagated toward a viewer 100.

At this time, since the sound output from the speaker device 1 is collected at or near the focal point F2, the sound image of the sound is localized at or near the focal point F2. Therefore, a virtual sound source is formed at or near the focal point F2.

As described above, in the speaker system 10F, the speaker device 1 is disposed on the rear side of the display 20, the reflector 2F is disposed to extend from an area on the rear side of the display 20 to an area outside the outer periphery of the display 20, and the sound output from the speaker device 1 is reflected a plurality of times by the elliptical reflection surface 3, whereby a sound image of a virtual sound source is localized within the region of the projection surface 21*a*.

Therefore, the speaker device 1 is disposed at a position invisible from the viewer 100, so that the speaker device 1 does not enter the field of vision of the viewer 100. Thus, the visibility for the viewer 100 can be improved. In addition, since the speaker device 1 is disposed on the rear side of the display 20, wiring provided on the rear side of the display 20 can be used.

Furthermore, since the portion of the reflector 2F located on the rear side of the display 20 is provided as a semi-ellipsoid, the elliptical reflection surface 3 reflects the entire sound output from the speaker device 1, and the entire sound output from the speaker device 1 is reflected by the elliptical reflection surface 3 by one reflection. Therefore, the sound pressure can be improved by reducing a loss of sound.

Furthermore, since the speaker device 1 is disposed on the rear side of the display 20, the sound traveling around the speaker device 1 is shielded by the display 20, whereby a comfortable viewing state for the viewer 100 can be ensured.

Speaker System According to Eighth Embodiment

Figure 13:
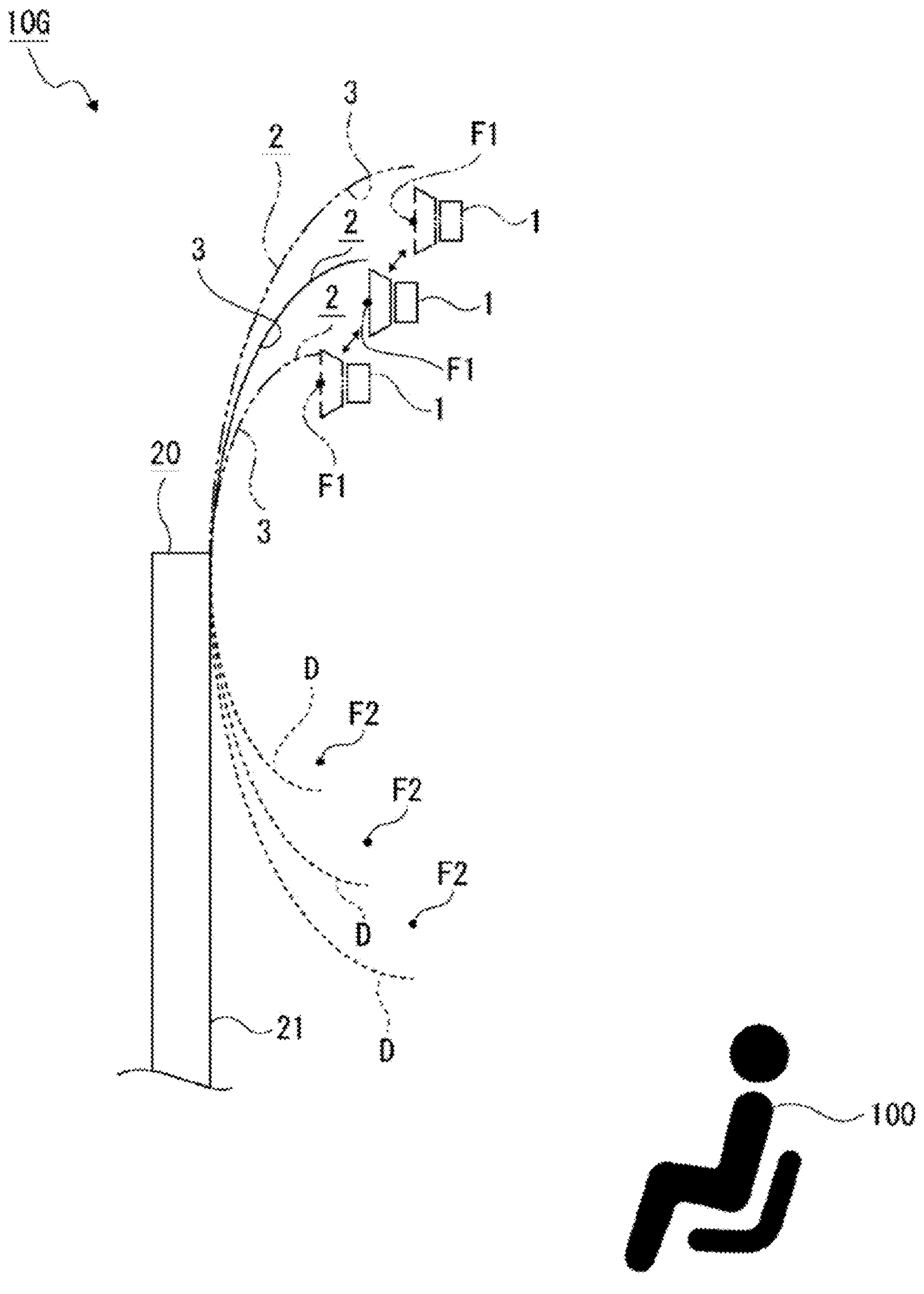
FIG. 13 is a diagram illustrating an eighth embodiment.

Next, a speaker system 10G according to an eighth embodiment will be described (see FIG. 13).

The speaker system 10G includes a speaker device 1 and a reflector 2.

The speaker device 1 is disposed in an orientation so that a sound is output rearward.

The reflector 2 is disposed above a display 20 and is located outside the region of a projection surface 21*a*. The reflector 2 includes a deformable material, and has, for example, a piezoelectric film (not illustrated) attached to an outer surface thereof. The piezoelectric film can be applied with a voltage. When a voltage is applied to the piezoelectric film, the piezoelectric film is deformed into a curvature corresponding to the magnitude of the applied voltage.

Therefore, an elliptical reflection surface 3 of the reflector 2 is deformed into a curvature corresponding to the deformation of the piezoelectric film, and the focal length between a focal point F1 and a focal point F2 is changed by the deformation.

The speaker device 1 is disposed at or near the upper focal point F1 of the reflector 2. The speaker device 1 is movable by a moving mechanism (not illustrated), and is moved according to the position of the focal point F1 that is changed in position with the deformation of the reflector 2. Therefore, since the speaker device 1 is movable, the speaker device 1 is always positioned at or near the focal point F1 that is changed in position. The speaker device 1 is disposed outside the region of the projection surface 21*a* regardless of the position to which the speaker device 1 is moved.

Note that the deformation state of the reflector 2 when the reflector 2 is deformed may include a plurality of deformation states determined in advance. For example, the deformation state may be settable to a first deformation state having a first curvature, a second deformation state having a second curvature, and a third deformation state having a third curvature. In this case, the position of the focal point F1 is also determined in each of the deformation states preset in advance. Therefore, the speaker devices 1, 1, and 1 may be separately fixed at or near the positions where the focal point F1 that is changed is to be located.

In the speaker system 10G configured as described above, when a sound is output from the speaker device 1, the output sound is reflected by the elliptical reflection surface 3 of the reflector 2, collected at the focal point F2, and propagated toward a viewer 100.

At this time, the sound output from the speaker device 1 is collected at the focal point F2 that is changed in position, and thus, the sound image of the sound is localized on each of the focal points F2. Therefore, a virtual sound source is formed at each of the focal points F2.

As described above, in the speaker system 10G, the curvature of the elliptical reflection surface 3 is varied, and the position of the speaker device 1 is changed according to the displacement of the position of the focal point due to the change in the curvature of the elliptical reflection surface 3. Therefore, the position of the virtual sound source to which the sound image is localized can be changed by the change in the position of the speaker device 1, whereby the display position of a video and the output position of the sound can be changed according to a display state of a display surface 21.

Speaker System According to Ninth Embodiment

Figure 14:
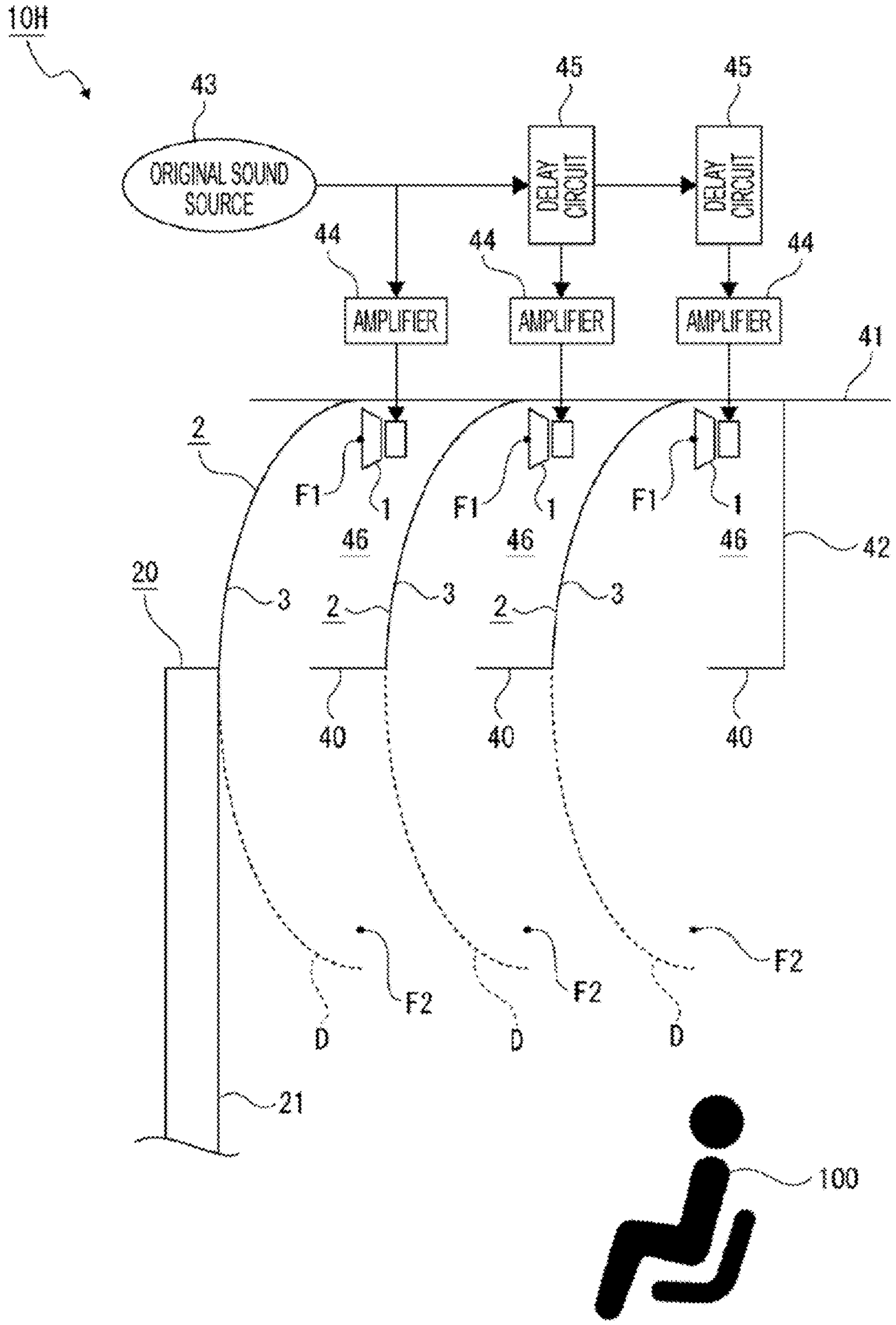
FIG. 14 is a diagram illustrating a ninth embodiment.

Next, a speaker system 10H according to a ninth embodiment will be described (see FIG. 14).

The speaker system 10H includes a plurality of speaker devices 1 and a plurality of reflectors 2. For example, the speaker system 10H includes three speaker devices 1, 1, and 1 and three reflectors 2, 2, and 2. Note that, in the following, an example in which three speaker devices 1 and three reflectors 2 are disposed will be described, but the number of speaker devices 1 and the number of reflectors 2 to be disposed are freely determined as long as they are two or more.

The speaker devices 1 are disposed in an orientation so that a sound is output rearward.

The reflectors 2, 2, and 2 are disposed outside the outer periphery of a display 20, and are located outside the region of a projection surface 21*a*. The reflectors 2, 2, and 2 are located above the display 20 so as to be separated from each other in the front-rear direction, for example. Each reflector 2 is formed into a shape concave in the forward direction, and is disposed in an orientation in which the major axis direction coincides with the vertical direction.

Horizontal light shielding plates 40 and 40 facing the vertical direction are attached to the reflectors 2 and 2 other than the reflector 2 disposed on the rearmost side. Each horizontal light shielding plate 40 protrudes rearward from the lower end of the reflector 2. The upper ends of the reflectors 2, 2, and 2 are fixed to the lower surface of a fixing plate 41 facing the vertical direction. The upper end of a vertical light shielding plate 42 facing the front-rear direction is fixed to the lower surface of the fixing plate 41 in front of the speaker device 1 disposed on the foremost side, and the horizontal light shielding plate 40 is attached to the lower end of the vertical light shielding plate 42. The horizontal light shielding plate 40 protrudes rearward from the lower end of the vertical light shielding plate 42.

The speaker devices 1, 1, and 1 are disposed at or near focal points F1, F1, and F1 of the reflectors 2, 2, and 2, respectively. The speaker devices 1, 1, and 1 are respectively disposed in different spaces 46, 46, and 46 defined by the reflectors 2, the horizontal light shielding plates 40, the fixing plate 41, and the vertical light shielding plate 42.

The speaker devices 1, 1, and 1 are connected to an original sound source 43 via amplifiers 44, 44, and 44, respectively, and the speaker devices 1 and 1 other than the speaker device 1 disposed on the rearmost side have incorporated therein delay circuits 45 and 45 between the original sound source 43 and the amplifiers 44 and 44.

In the speaker system 10H configured as described above, when a sound is output from the original sound source 43, sounds amplified by the amplifiers 44, 44, and 44 are output from the speaker devices 1, 1, and 1, respectively. At this time, the two speaker devices 1 and 1 on the front side delay the sounds by the delay circuits 45 and 45 and output the delayed sounds. Specifically, the sound output from the speaker device 1 disposed at the center in the front-rear direction is delayed and output with respect to the sound output from the speaker device 1 disposed at the rearmost side, and the sound output from the speaker device 1 disposed at the foremost side is delayed and output with respect to the sound output from the speaker device 1 disposed at the center in the front-rear direction.

When sounds are output from the speaker devices 1, 1, and 1, the horizontal light shielding plates 40, 40, and 40 and the vertical light shielding plate 42 shield the sound that travels around the speaker devices 1, 1, and 1 and propagates forward or obliquely downward and forward.

In addition, when sounds are output from the speaker devices 1, 1, and 1, the sound traveling around the speaker device 1 disposed at the rearmost side is shielded by the reflector 2 disposed at the center in the front-rear direction, and the sound traveling around the speaker device 1 disposed at the center in the front-rear direction is shielded by the reflector 2 disposed at the foremost side. Therefore, the reflector 2 disposed at the center in the front-rear direction and the reflector 2 disposed at the foremost side have both functions of reflecting the sound necessary for listening and shielding the sound traveling around the speaker devices 1 and 1 and unnecessary for listening, whereby it is possible to improve the functionality of the reflectors 2 and 2 with a reduction in the number of parts and the simplification of the configuration being ensured.

As described above, the sounds output from the speaker devices 1, 1, and 1 are reflected by elliptical reflection surfaces 3, 3, and 3 of the reflectors 2, 2, and 2, respectively, collected at the focal points F2, F2, and F2, and propagated toward a viewer 100.

At this time, since the sounds output from the speaker devices 1, 1, and 1 are collected at the focal points F2, F2, and F2, respectively, the sound images of the sounds are localized on the focal points F2, F2, and F2. Therefore, virtual sound sources are respectively formed at the focal points F2, F2, and F2.

Thus, the viewer 100 recognizes as if the sounds output from the speaker devices 1, 1, and 1 are output from a display surface 21 of the display 20.

Furthermore, the sounds output from the speaker device 1 disposed at the center in the front-rear direction and the speaker device 1 disposed at the foremost side are delayed by the delay circuits 45 and 45 and output as described above, and thus, the sounds output from the respective virtual sound sources are propagated toward the viewer 100 in synchronization with each other.

As described above, in the speaker system 10H, the speaker devices 1, 1, and 1 are disposed corresponding to the plurality of reflectors 2, 2, and 2, respectively, and the delay circuits 45 and 45 that synchronize the sounds output from the virtual sound sources corresponding to the plurality of speaker devices 1, 1, and 1, respectively, are provided.

Therefore, since the sounds output from the virtual sound sources corresponding to the speaker devices 1, 1, and 1 are synchronized by the delay circuits 45 and 45 and reach the viewer 100, it is possible to improve the sound pressure and ensure a comfortable sound listening state with high directivity.

Figure 15:
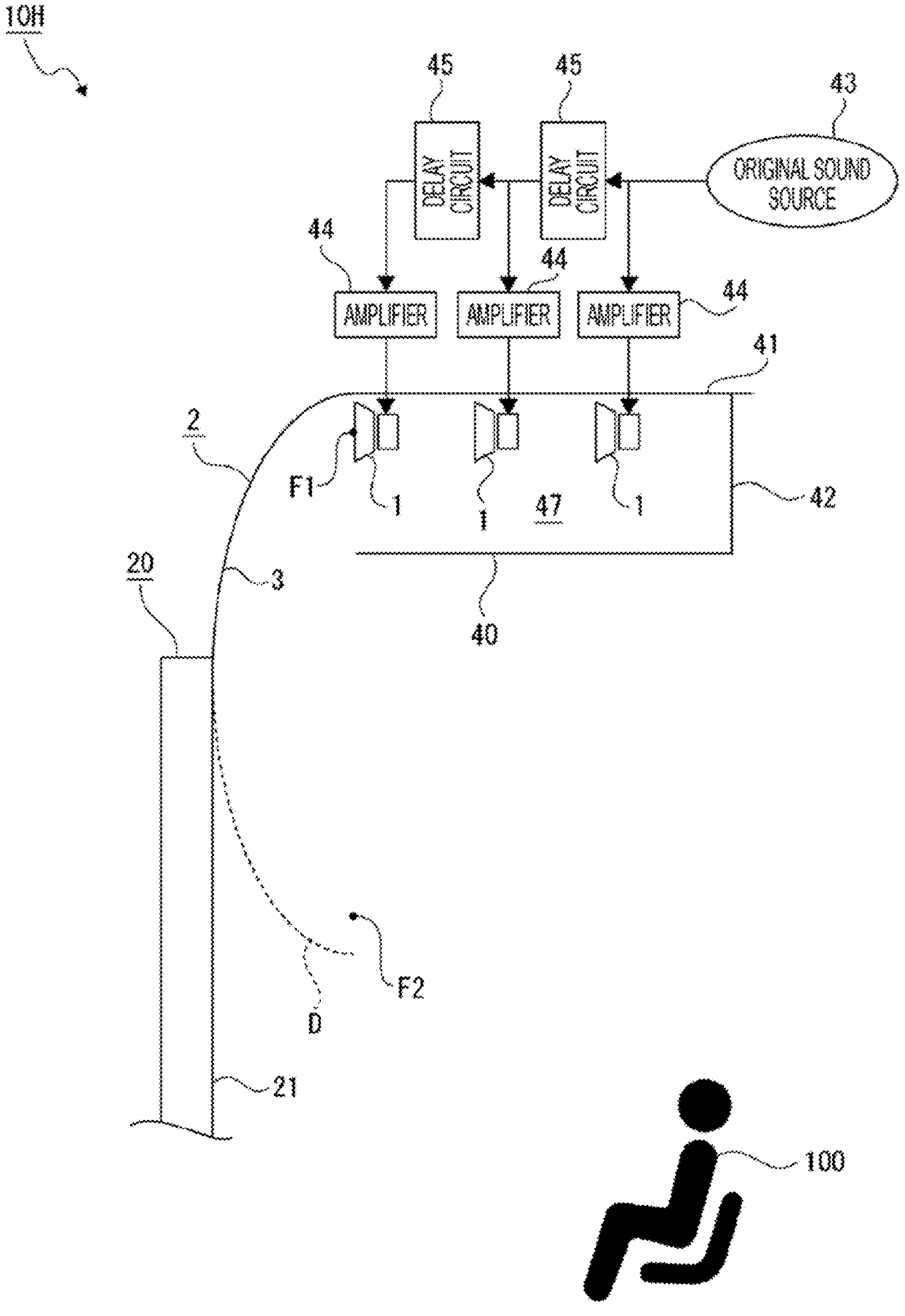
FIG. 15 is a diagram illustrating a configuration in which a plurality of speaker devices is arranged in the same space in the ninth embodiment.

Note that, although the above description indicates an example in which the speaker devices 1, 1, and 1 are respectively disposed in the different spaces 46, 46, and 46 defined by the reflectors 2, the vertical light shielding plate 42, etc., the speaker devices 1, 1, and 1 may be disposed in a same space 47 (see FIG. 15).

For example, a single reflector 2, a single horizontal light shielding plate 40, a single fixing plate 41, and a single vertical light shielding plate 42 are provided, the speaker devices 1, 1, and 1 positioned to be separated from each other in the front-rear direction are disposed in the space 47 defined by the horizontal light shielding plate 40, the fixing plate 41, and the vertical light shielding plate 42, and the upper end of the reflector 2 is fixed to the rear end of the fixing plate 41. The rearmost speaker device 1 is disposed at or near a focal point F1 of the reflector 2.

In this configuration, when a sound is output from the original sound source 43, the sound output from the speaker device 1 disposed at the center in the front-rear direction is delayed and output with respect to the sound output from the speaker device 1 disposed at the foremost side, and the sound output from the speaker device 1 disposed at the rearmost side is delayed and output with respect to the sound output from the speaker device 1 disposed at the center in the front-rear direction.

When sounds are output from the speaker devices 1, 1, and 1, unnecessary sound is shielded by the horizontal light shielding plate 40 and the vertical light shielding plate 42.

As described above, the sounds output from the speaker devices 1, 1, and 1 are reflected by an elliptical reflection surface 3 of the reflector 2, collected at the focal point F2, and propagated toward the viewer 100.

At this time, since the sounds output from the speaker devices 1, 1, and 1 are collected at the focal point F2, the sound images of the sounds are localized on the focal point F2, and a virtual sound source is formed at the focal point F2.

Thus, the viewer 100 recognizes as if the sounds output from the speaker devices 1, 1, and 1 are output from the display surface 21 of the display 20.

Furthermore, the sounds output from the speaker device 1 disposed at the center in the front-rear direction and the speaker device 1 disposed at the foremost side are delayed by the delay circuits 45 and 45 and output as described above, and thus, the sounds output from the respective virtual sound sources are propagated toward the viewer 100 in synchronization with each other.

With the above configuration, the speaker devices 1, 1, and 1 are disposed in the same space 47, the horizontal light shielding plate 40 is disposed below the speaker devices 1, 1, and 1, and there is no gap below the speaker devices 1, 1, and 1. Therefore, the effect of shielding unnecessary sound when the sound is output from the speaker devices 1, 1, and 1 is enhanced, and it is possible to improve the sound pressure and ensure a more comfortable sound listening state with high directivity.

Speaker System According to Tenth Embodiment

Figure 16:
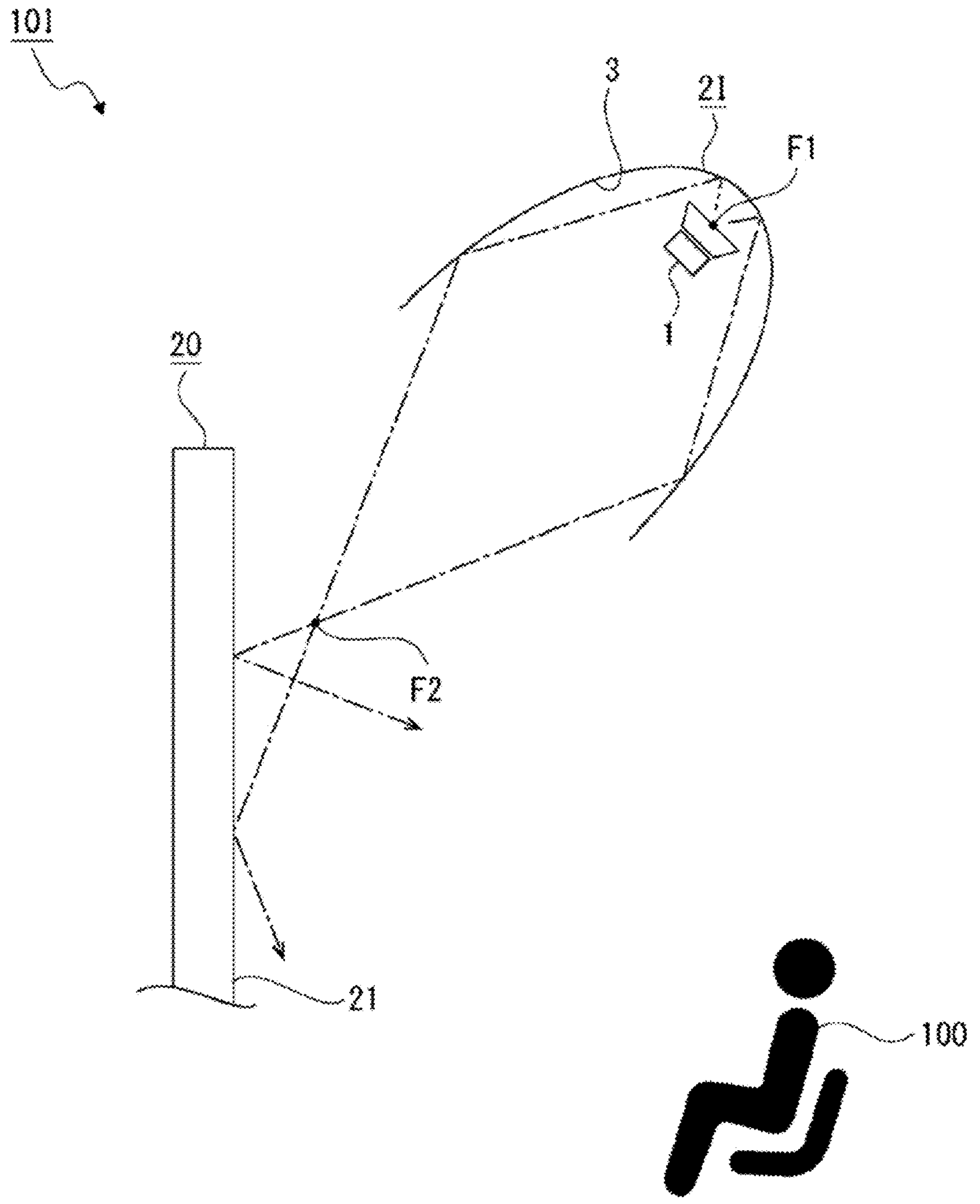
FIG. 16 is a diagram illustrating a tenth embodiment.

Next, a speaker system 10I according to a tenth embodiment will be described (see FIG. 16).

The speaker system 10I includes a speaker device 1 and a reflector 2I.

The speaker device 1 is disposed in an orientation so that a sound is output forward and obliquely upward.

The reflector 2I is disposed in front of the upper end of a display 20, and is formed into, for example, a semi-ellipsoid having a half of an ellipsoid in the major axis direction. The major axis direction is inclined so that the front side is lowered with respect to the vertical direction.

The speaker device 1 is disposed at or near a focal point F1 which is one of focal points of the reflector 2I. The speaker device 1 is disposed inside the reflector 2I and is located outside the region of a projection surface 21*a*. The speaker device 1 is disposed in an orientation so that a sound is output in a direction opposite to a focal point F2 which is the other of the focal points in the major axis direction of the reflector 2I.

In the speaker system 10I configured as described above, when a sound is output from the speaker device 1, the output sound is reflected twice by an elliptical reflection surface 3 of the reflector 2I and collected at the focal point F2. The sound collected at the focal point F2 is reflected by a display surface 21 and propagated toward a viewer 100.

At this time, since the sound output from the speaker device 1 is collected at the focal point F2, the sound image of the sound is localized on the focal point F2, and a virtual sound source is formed at the focal point F2. The virtual sound source formed at the focal point F2 is located at a position closer to the display surface 21 with respect to the speaker device 1 disposed at or near the focal point F1 in the direction (front-rear direction) orthogonal to the display surface 21.

As described above, in the speaker system 10I, the virtual sound source is positioned closer to the display surface 21 with respect to the speaker device 1 in the direction orthogonal to the display surface 21 of the display 20.

Therefore, since the virtual sound source is located at a position closer to the display surface 21 with respect to the speaker device 1 functioning as a real sound source, the viewer 100 can listen to the sound with high directivity.

In addition, the reflector 2I is provided as a semi-ellipsoid and the elliptical reflection surface 3 reflects the entire sound output from the speaker device 1, whereby it is possible to improve the sound pressure by reducing a loss of sound.

Furthermore, the sound is easily propagated from the virtual sound source in a necessary direction and toward a necessary region by adjusting the inclination angle of the reflector 2I and the position of the reflector 2I with respect to the display 20, and it is possible to propagate the sound in the necessary direction and toward the necessary region while improving a degree of freedom of design.

Figure 17:
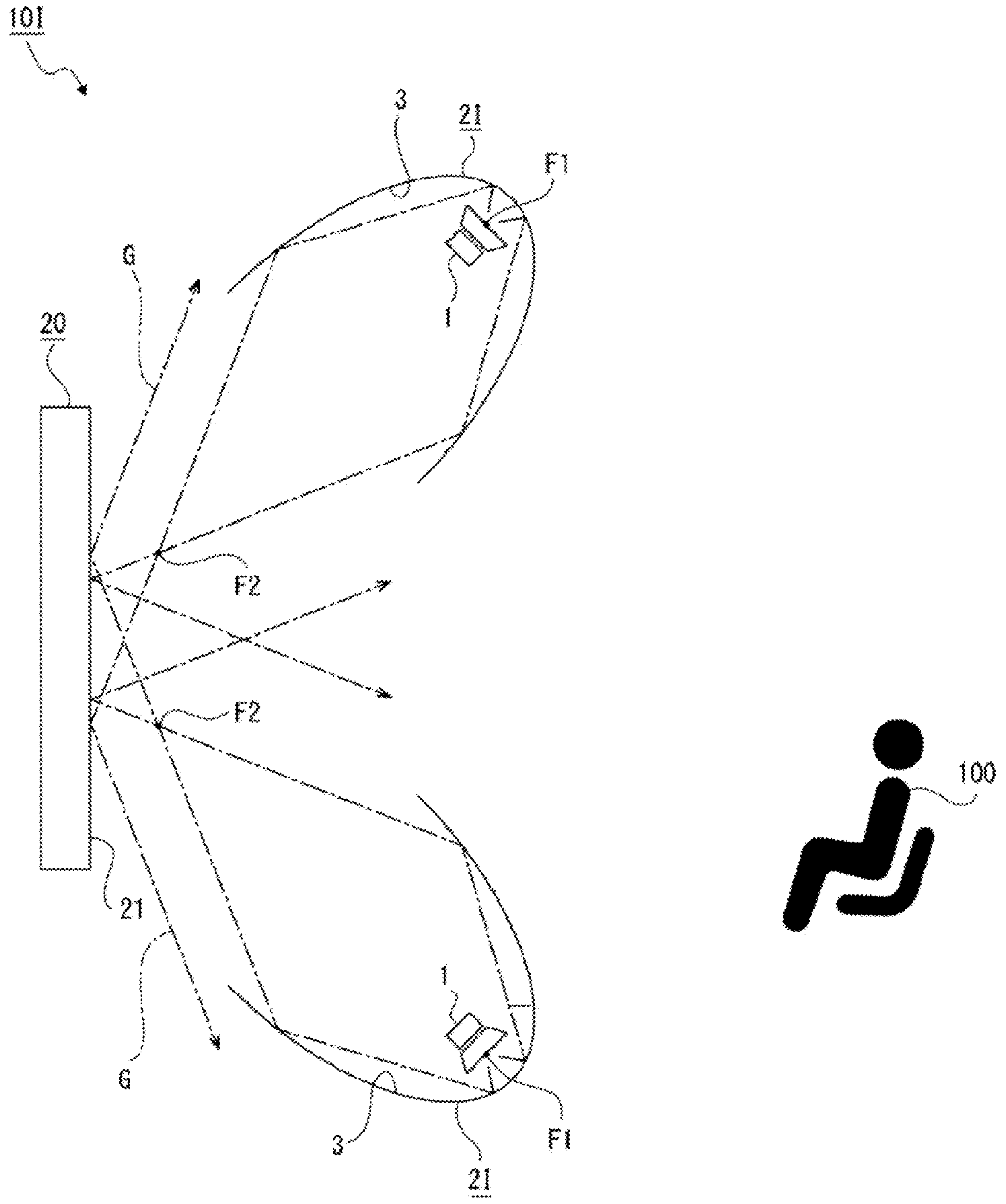
FIG. 17 is a diagram illustrating a configuration in which speaker devices are arranged on an upper side and a lower side in the tenth embodiment.

Note that, although the above description indicates an example in which the reflector 2I is disposed in front of the display 20 on the upper end side, the reflectors 2I and 2I may be disposed, for example, in front of the display 20 on the upper end side and the lower end side, respectively (see FIG. 17). In this case, the lower reflector 2I is inclined such that the major axis direction is inclined so that the front side is raised with respect to the vertical direction.

With this configuration, it is possible to propagate the sound in a necessary direction and toward a necessary region while ensuring a high sound pressure and high directivity.

Figure 18:
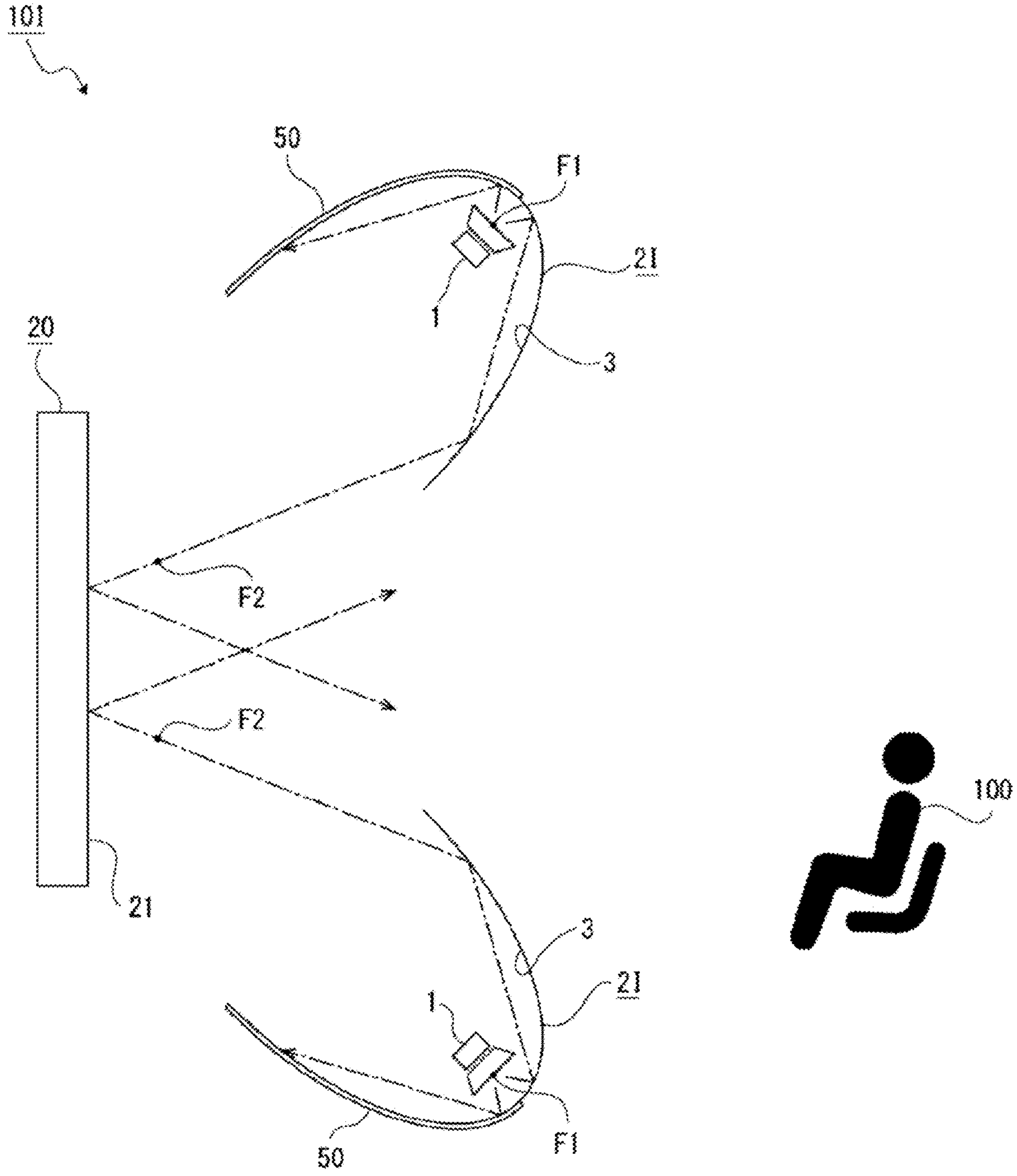
FIG. 18 is a diagram illustrating an example in which a part of a reflector has a sound absorbing function in the tenth embodiment.

Furthermore, in a case where an unnecessary sound that is unnecessary for the viewer 100 listening to the sound is output, the speaker system 10I may be configured such that a sound absorbing material 50 is attached to a part of the reflector 2I or a part of the reflector 2I is formed as a sound absorbing wall (see FIG. 18). Examples of such an unnecessary sound include a sound that reaches a ceiling surface or a floor surface and unintentionally echoes, and a sound that is reflected on the ceiling surface or the floor surface, delayed, and propagated toward the viewer 100 (see G, G in FIG. 17).

Due to the configuration in which the sound absorbing material 50 is attached to a part of the reflector 2I or a part of the reflector 2I is formed as a sound absorbing wall as described above, the unnecessary sound that is unnecessary for the viewer 100 listening to the sound is absorbed by the sound absorbing material 50 or the sound absorbing wall, whereby a comfortable viewing state without discomfort can be ensured for the viewer 100.

SUMMARY

As described above, each of the speaker systems 10 to 10I includes: the speaker device 1 that is disposed outside a region of the projection surface 21*a* and functions as a real sound source; and the reflector 2 (2Y, 2V, 2W, 2F, 2I) that has a reflection surface reflecting a sound output from the speaker device 1 and that localizes a sound image of a virtual sound source within the region of the projection surface 21*a*, in which the reflector 2 (2Y, 2V, 2W, 2F, 2I) has the elliptical reflection surface 3 in at least a part of the reflection surface.

Therefore, since the sound output from the speaker device 1 disposed outside the region of the projection surface 21*a* for the display surface 21 of the display 20 is reflected by the reflector 2 (2Y, 2V, 2W, 2F, 2I), and a sound image thereof is localized within the region of the projection surface 21*a*, it is possible to bring the display position of a video into alignment with the output position of the sound, whereby a comfortable viewing state can be ensured for the viewer 100.

In addition, each of the speaker systems 10 to 10I uses, as a sound output method, a method including: outputting a sound from the speaker device 1 that is disposed outside a region of the projection surface 21*a* and functions as a real sound source; and reflecting the sound output from the speaker device 1 by the elliptical reflection surface 3 formed on the reflector 2 (2Y, 2V, 2W, 2F, 2I) so as to localize a sound image of a virtual sound source within the region of the projection surface 21*a*.

Therefore, since the sound output from the speaker device 1 disposed outside the region of the projection surface 21*a* for the display surface 21 of the display 20 is reflected by the reflector 2 (2Y, 2V, 2W, 2F, 2I), and a sound image thereof is localized within the region of the projection surface 21*a*, it is possible to bring the display position of a video into alignment with the output position of the sound, whereby a comfortable viewing state can be ensured for the viewer 100.

Present Technology

The present technology may also have the following configurations.

(1)

A speaker system including:

a speaker device that is disposed outside a region of a projection surface on which a display surface of a display is projected, the speaker device functioning as a real sound source; and a reflector that has a reflection surface reflecting a sound output from the speaker device, the reflector localizing a sound image of a virtual sound source within the region of the projection surface, in which the reflector has an elliptical reflection surface in at least a part of the reflection surface.

(2)

The speaker system according to (1) described above, in which the speaker device is disposed at or near one of focal points on the elliptical reflection surface.

(3)

The speaker system according to (1) or (2) described above, in which the reflector is disposed outside the region of the projection surface.

(4)

The speaker system according to any one of (1) to (3) described above, in which the sound image of the virtual sound source is localized at a central part of the projection surface.

(5)

The speaker system according to any one of (1) to (4) described above, in which the speaker device and the reflector are disposed above the display.

(6)

The speaker system according to any one of (1) to (5) described above, in which a midpoint between two focal points on the elliptical reflection surface is located outside the region of the projection surface.

(7)

The speaker system according to any one of (1) to (6) described above, in which the elliptical reflection surface has a major axis that is inclined with respect to the display surface.

(8)

The speaker system according to any one of (1) to (7) described above, in which the virtual sound source is located at a position closer to the display surface with respect to the speaker device in a direction orthogonal to the display surface.

(9)

The speaker system according to any one of (1) to (8) described above, in which a plurality of the reflectors is provided, the focal points of each of the plurality of reflectors coincide with each other, and the sound output from the speaker device is sequentially reflected by the elliptical reflection surfaces of the plurality of reflectors.

(10)

The speaker system according to (9) described above, in which, in two of the reflectors that sequentially reflect the sound, a major axis of the elliptical reflection surface of one of the two reflectors and a major axis of the elliptical reflection surface of another one of the two reflectors are orthogonal to each other.

(11)

The speaker system according to any one of (1) to (8) described above, in which a plurality of the reflectors is provided, and a plurality of the speaker devices is provided corresponding to the plurality of reflectors, the speaker system further including a delay circuit that synchronizes sounds output from the virtual sound sources respectively corresponding to the plurality of speaker devices.

(12)

The speaker system according to any one of (1) to (11) described above, in which a plurality of the speaker devices and a plurality of the reflectors are disposed around the display.

(13)

The speaker system according to any one of (1) to (12) described above further including a parabolic reflective plate that has a parabolic reflection surface formed into a paraboloid shape, in which the sound output from the speaker device is reflected by the parabolic reflection surface toward the elliptical reflection surface.

(14)

The speaker system according to any one of (1) to (12) described above further including a shielding wall that shields a sound included in the sound output from the speaker device and not reflected by the elliptical reflection surface.

(15)

The speaker system according to any one of (1) to (14) described above, in which the speaker device is disposed on a rear side of the display, the reflector is disposed in an area from the rear side of the display to an outside of an outer periphery of the display, and the sound image of the virtual sound source is localized within the region of the projection surface due to the sound output from the speaker device being reflected twice by the elliptical reflection surface.

(16)

The speaker system according to any one of (1) to (15) described above, in which the elliptical reflection surface has a curvature that is variable, and the speaker device is changed in position according to displacement of a position of a focal point due to a change in curvature of the elliptical reflection surface.

(17)

A sound output method including:

outputting a sound from a speaker device that is disposed outside a region of a projection surface on which a display surface of a display is projected, the speaker device functioning as a real sound source; and reflecting the sound output from the speaker device by an elliptical reflection surface formed on a reflector so as to localize a sound image of a virtual sound source within the region of the projection surface.

REFERENCE SIGNS LIST

20 Display
21 Display surface
21*a* Projection surface
10 Speaker system
1 Speaker device
2 Reflector
3 Elliptical reflection surface
30 Shielding wall
100 Viewer
10X Speaker system
10Y Speaker system
2Y Reflector
10Z Speaker system
10A Speaker system
2V Reflector
2W Reflector
10B Speaker system
10C Speaker system
10D Speaker system
10E Speaker system
4 Parabolic reflective plate
4*a* Parabolic reflection surface
10F Speaker system
2F Reflector
10G Speaker system
10H Speaker system
45 Delay circuit
10I Speaker system
2I Reflector

The invention claimed is:

1. A speaker system comprising:

a speaker device that is disposed outside a region of a projection surface on which a display surface of a display is projected, the speaker device functioning as a real sound source; and a reflector that has a reflection surface reflecting a sound output from the speaker device, the reflector localizing a sound image of a virtual sound source within the region of the projection surface, wherein the reflector has an elliptical reflection surface in at least a part of the reflection surface, and wherein the speaker device and the reflector are positioned and arranged relative to the projection surface such that transmission of the sound output of the speaker device through the projection surface is avoided and such that the sound image of the virtual sound source is localized in front of the projection surface.

2. The speaker system according to claim 1, wherein the speaker device is disposed at or near one of focal points on the elliptical reflection surface.

3. The speaker system according to claim 1, wherein the reflector is disposed outside the region of the projection surface.

4. The speaker system according to claim 1, wherein the sound image of the virtual sound source is localized at a central part of the projection surface.

5. The speaker system according to claim 1, wherein the speaker device and the reflector are disposed above the display.

6. The speaker system according to claim 1, wherein a midpoint between two focal points on the elliptical reflection surface is located outside the region of the projection surface.

7. The speaker system according to claim 1, wherein the elliptical reflection surface has a major axis that is inclined with respect to the display surface.

8. The speaker system according to claim 1, wherein the virtual sound source is located at a position closer to the display surface with respect to the speaker device in a direction orthogonal to the display surface.

9. A speaker system comprising:

a speaker device that is disposed outside a region of a projection surface on which a display surface of a display is projected, the speaker device functioning as a real sound source; and a reflector that has a reflection surface reflecting a sound output from the speaker device, the reflector localizing a sound image of a virtual sound source within the region of the projection surface, wherein the reflector has an elliptical reflection surface in at least a part of the reflection surface, and wherein a plurality of the reflectors is provided, focal points of each of the plurality of the reflectors coincide with each other, and the sound output from the speaker device is sequentially reflected by the elliptical reflection surfaces of the plurality of the reflectors.

10. The speaker system according to claim 9, wherein, in two of the reflectors that sequentially reflect the sound, a major axis of the elliptical reflection surface of one of the two reflectors and a major axis of the elliptical reflection surface of another one of the two reflectors are orthogonal to each other.

11. The speaker system according to claim 1, wherein a plurality of the reflectors is provided, and a plurality of the speaker devices is provided corresponding to the plurality of the reflectors, the speaker system further comprising a delay circuit that synchronizes sounds output from the virtual sound sources respectively corresponding to the plurality of the speaker devices.

12. The speaker system according to claim 1, wherein a plurality of the speaker devices and a plurality of the reflectors are disposed around the display.

13. The speaker system according to claim 1 further comprising a parabolic reflective plate that has a parabolic reflection surface formed into a paraboloid shape, wherein the sound output from the speaker device is reflected by the parabolic reflection surface toward the elliptical reflection surface.

14. The speaker system according to claim 1 further comprising a shielding wall that shields a sound included in the sound output from the speaker device and not reflected by the elliptical reflection surface.

15. The speaker system according to claim 1, wherein the speaker device is disposed on a rear side of the display, the reflector is disposed in an area from the rear side of the display to an outside of an outer periphery of the display, and the sound image of the virtual sound source is localized within the region of the projection surface due to the sound output from the speaker device being reflected twice by the elliptical reflection surface.

16. The speaker system according to claim 1, wherein the elliptical reflection surface has a curvature that is variable, and the speaker device is changed in position according to displacement of a position of a focal point due to a change in curvature of the elliptical reflection surface.

17. A sound output method comprising:

outputting a sound from a speaker device that is disposed outside a region of a projection surface on which a display surface of a display is projected, the speaker device functioning as a real sound source; and reflecting the sound output from the speaker device by an elliptical reflection surface formed on a reflector so as to localize a sound image of a virtual sound source within the region of the projection surface, wherein the speaker device and the reflector are positioned and arranged relative to the projection surface such that transmission of the sound output of the speaker device through the projection surface is avoided and such that the sound image of the virtual sound source is localized in front of the projection surface.

* * * * *